(12) United States Patent
Mizushima et al.

(10) Patent No.: US 7,761,655 B2
(45) Date of Patent: Jul. 20, 2010

(54) STORAGE SYSTEM AND METHOD OF PREVENTING DETERIORATION OF WRITE PERFORMANCE IN STORAGE SYSTEM

(75) Inventors: Nagamasa Mizushima, Machida (JP); Shuji Nakamura, Machida (JP)

(73) Assignee: Hitachi, Ltd., Tokyo (JP)

( * ) Notice: Subject to any disclaimer, the term of this patent is extended or adjusted under 35 U.S.C. 154(b) by 416 days.

(21) Appl. No.: 11/968,218

(22) Filed: Jan. 2, 2008

(65) Prior Publication Data
US 2008/0229003 A1    Sep. 18, 2008

(30) Foreign Application Priority Data
Mar. 15, 2007    (JP) .............................. 2007-067142

(51) Int. Cl.
*G06F 12/00*    (2006.01)
(52) U.S. Cl. ...................................... 711/103
(58) Field of Classification Search ........................ None
See application file for complete search history.

(56) References Cited

U.S. PATENT DOCUMENTS

| | | | | | |
|---|---|---|---|---|---|
| 5,359,569 | A | * | 10/1994 | Fujita et al. | 365/229 |
| 5,483,491 | A | * | 1/1996 | Yoshioka et al. | 365/200 |
| 5,936,971 | A | | 8/1999 | Harari et al. | |
| 6,388,919 | B2 | * | 5/2002 | Terasaki | 365/185.09 |
| 6,826,081 | B2 | * | 11/2004 | Nagashima et al. | 365/185.09 |
| 2002/0099995 | A1 | * | 7/2002 | Furukawa | 714/766 |

* cited by examiner

*Primary Examiner*—Hiep T Nguyen
(74) *Attorney, Agent, or Firm*—Brundidge & Stanger, P.C.

(57) ABSTRACT

Provided is a storage system capable of inhibiting the deterioration of its write performance. This storage system includes a flash memory, a cache memory, and a controller for controlling the reading, writing and deletion of data of the flash memory and the reading and writing of data of the cache memory, and detecting the generation of a defective block in the flash memory. When the controller detects the generation of a defective block in the flash memory, it migrates prescribed data stored in the flash memory to the cache memory and, even upon receiving from the host computer a command for updating the migrated data, disables the writing of data in the flash memory based on the command.

17 Claims, 12 Drawing Sheets

| ITEM NAME | T1 | T2 | T3 |
|---|---|---|---|
| REDUNDANCY OF LOGICAL PAGE OF FLASH MEMORY | 24/12 =200% | 20/12 =167% | 20/8 =250% |
| INVALID PAGE CONTENT (AVERAGE) DURING GARBAGE COLLECTION | 8/20 =40% | 4/16 =25% | 8/16 =50% |
| VALID PAGE MIGRATION VOLUME (AVERAGE) DURING GARBAGE COLLECTION | 60% | 75% | 50% |
| WRITE PERFORMANCE OF FLASH MEMORY |  | DECREASED | IMPROVED |
| HIT PROBABILITY OF FLASH MEMORY |  | UNCHANGED | DECREASED |

STORAGE SYSTEM AND METHOD OF PREVENTING DETERIORATION OF WRITE PERFORMANCE IN STORAGE SYSTEM

CROSS REFERENCES

This application relates to and claims priority from Japanese Patent Application No. 2007-067142, filed on Mar. 15, 2007, the entire disclosure of which is incorporated herein by reference.

BACKGROUND

The present invention generally relates to a storage system and a method for preventing deterioration of write performance in a storage system using an electrically rewritable nonvolatile memory, and in particular relates to a storage system that uses a flash memory as the nonvolatile memory and a cache memory as the random access memory that is faster than the flash memory and which uses the cache memory in substitute for a defective flash memory block.

A flash memory is a nonvolatile memory that cannot be overwritten directly. Thus, in order to rewrite data, it is necessary to erase an erasure unit (block) configured from a plurality of write units (pages), and restore such pages to an unwritten state.

Therefore, with a standard storage system that uses a flash memory as its primary memory medium, when the host system does not update the stored data, it writes and validates new data in a backup extent that has been previously allocated to a part of the flash memory on the one hand, invalidates old data on the other hand, and thereafter erases the block containing the old data to make it a new backup extent. Incidentally, when there is other valid data remaining in the block to be erased, such valid data must be saved in an unwritten page of a different block prior to the foregoing erasure.

Generally speaking, the backup extent in the flash memory is also used as a substitute extent when another block becomes defective. Since a block of a flash memory is only guaranteed a write cycle of roughly 100,000 times, defective blocks will be generated on a daily basis if the host system repeatedly updates the stored data of the storage system, and the number of defective blocks will increase gradually. In addition, when the number of defective blocks increases to a point of filling the backup extent, it will become difficult to perform the foregoing stored data update control, and the storage system will become incapable of rewriting.

U.S. Pat. No. 5,936,971 describes a method of prolonging the rewriting lifespan of a data file storage system using a flash memory as the memory medium based on the following procedures using a cache memory: (1) Temporarily storing a flash memory data file from a host system in a cache memory capable of tolerating write/erasure cycles in a number that is significantly greater than a flash memory; (2) Writing a new data file in the cache memory in substitute for the flash memory according to a write request from the host system; (3) Storing in a tag memory the time from the last time the identifier of the data file and the respective data files were stored in the cache memory; and (4) When it is necessary to create additional space in the cache memory for a new data file, preferentially migrating the data file, in which the longest time has lapsed from the last writing by referring to the tag memory, from the cache memory to the flash memory. As a result of performing the processing described in (1) to (4) above, it is possible to significantly reduce the actual number of write counts and related stress in the flash memory.

SUMMARY

In a storage system that uses a flash memory as the memory medium, the size of the backup extent to be used in the foregoing stored data update control will gradually decrease pursuant to the increase in the number of defective blocks in the flash memory. The smaller the ratio of the backup extent size for update control in relation to the net stored data volume, the more inferior the operating efficiency (write count of the flash memory per rewriting unit of the host system) during the update process of the stored data of the storage system. This is because the average work rate upon saving the other valid data remaining in the erased block will increase in the foregoing stored data update control.

As a result, there is a problem in that the write performance of the storage system will gradually deteriorate pursuant to the increase in the number of defective blocks.

The present invention was made in view of the foregoing points. Thus, an object of the present invention is to propose a storage system and a method for preventing deterioration of write performance in a storage system capable of inhibiting the deterioration of write performance in a storage system.

The storage system of the present invention comprises a flash memory for writing data in page units and erasing the data in units of a block configured from a plurality of pages, and having a plurality of blocks and requiring the deletion of the blocks containing the pages in order to update the data, a cache memory for writing and temporarily storing data to be written in the flash memory at a speed that is faster than the flash memory, a controller for controlling the reading, writing and deletion of data of the flash memory and the reading and writing of data of the cache memory, and detecting the generation of a defective block in the flash memory, and a host computer for issuing a command requesting the write processing of the data. The controller migrates prescribed data stored in the flash memory to the cache memory upon detecting the generation of the defective block in the flash memory and, even upon receiving from the host computer a command for updating the migrated data, disables the writing of data in the flash memory based on the command.

In other words, as a result of comprising a flash memory for writing data in page units and erasing the data in units of a block configured from a plurality of pages, and having a plurality of blocks and requiring the deletion of the blocks containing the pages in order to update the data, a cache memory for writing and temporarily storing data to be written in the flash memory at a speed that is faster than the flash memory, a controller for controlling the reading, writing and deletion of data of the flash memory and the reading and writing of data of the cache memory, and detecting the generation of a defective block in the flash memory, and a host computer for issuing a command requesting the write processing of the data, and the controller migrating prescribed data stored in the flash memory to the cache memory upon detecting the generation of the defective block in the flash memory and, even upon receiving from the host computer a command for updating the migrated data, disabling the writing of data in the flash memory based on the command, it is possible to inhibit the deterioration of the operating efficiency during the update process of the stored data pursuant to the increase in the number of defective blocks of the flash memory. Thereby, even under circumstances where the hit rate of the cache memory is low, it is possible to inhibit the deterioration of the write performance in the storage system in comparison to conventional storage systems.

Further, by making the cache memory in the foregoing storage system a nonvolatile random access memory, for instance, a phase-change RAM (Random Access Memory), data substituted from the flash memory to the cache memory can be retained without any auxiliary power. Thus, the present invention yields an effect of reducing the electrical power consumption of the storage system, and protecting the loss of data caused by a failure such as a sudden power shutdown.

Accordingly, the present invention yields the effect of inhibiting the deterioration of the write performance in a storage system.

DETAILED DESCRIPTION

Embodiments of the present invention are now explained with reference to the attached drawings.

(1) Configuration of Storage System

Figure 1:
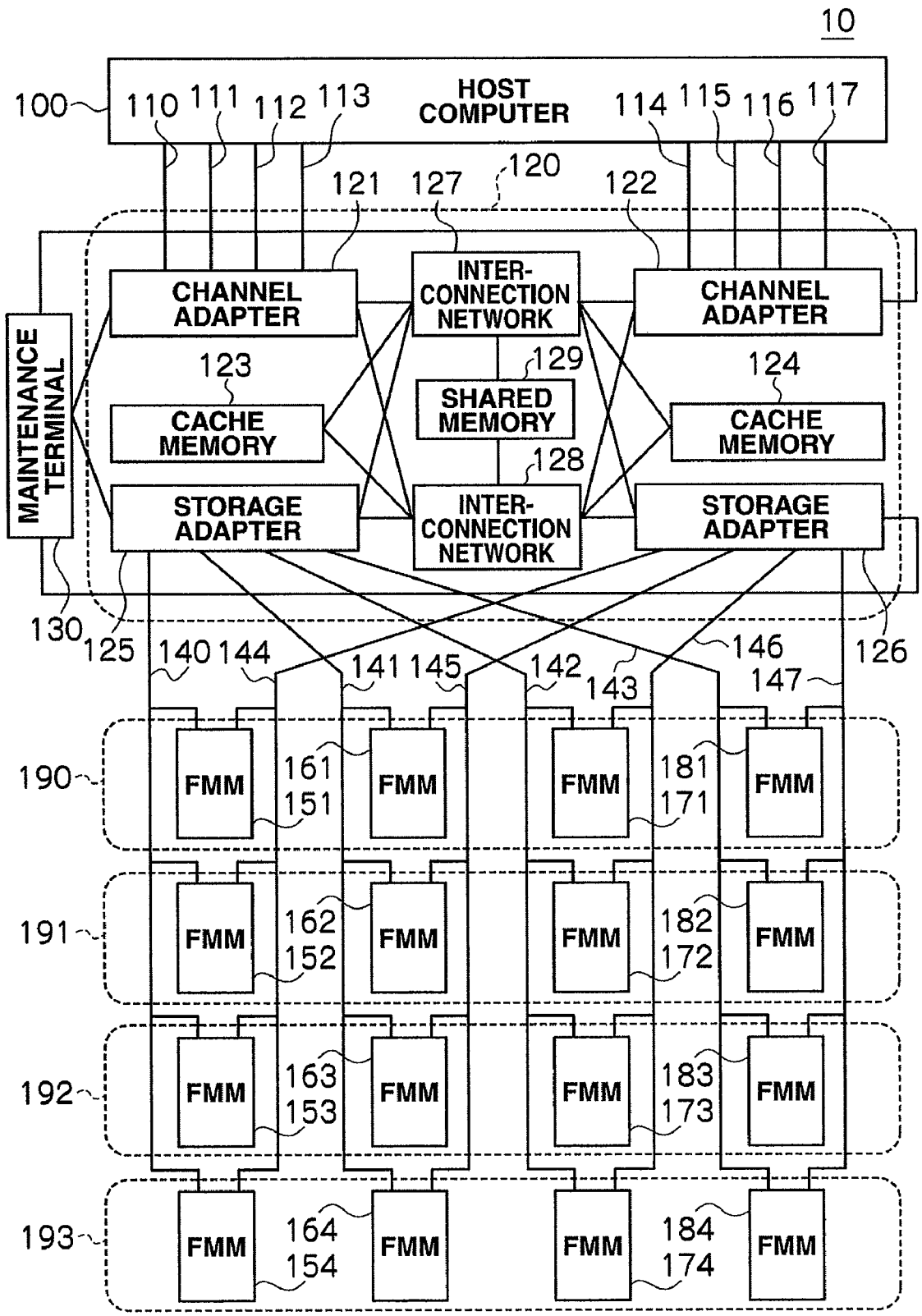
FIG. 1 is a diagram showing the configuration of a storage system according to the present invention.

FIG. 1 is a diagram showing a simplified hardware configuration of a storage system 10 applying the present invention.

The storage system 10 comprises a storage controller 120 and flash memory modules (FMM) 151 to 154, 161 to 164, 171 to 174, and 181 to 184. The storage controller 120 comprises channel adapters 121, 122, cache memories 123, 124, storage adapters 125, 126, a shared memory 129, and interconnection networks 127, 128.

Incidentally, although the illustrated example shows a case where the storage controller 120 has the channel adapters 121, 122, the cache memories 123, 124, the storage adapters 125, 126, and the shared memory 129, the quantity of these components is not limited thereto.

The interconnection networks 127 and 128, for instance, are switches or the like, and mutually connect the respective components configuring the storage controller 120. Specifically, the interconnection networks 127 and 128 mutually connect the channel adapter 121, the cache memory 123, the storage adapter 125, and the shared memory 129. Similarly, the interconnection networks 127, 128 mutually connect the channel adapter 122, the cache memory 124, the storage adapter 126, and the shared memory 129.

The channel adapter 121 is connected to the host computer 100 via channels 110, 111, 112, 113. Similarly, the channel adapter 122 is connected to the host computer 100 via channels 114, 115, 116, 117. The host computer 100 is a computer such as a personal computer, workstation, mainframe computer or the like, and requests the storage controller 120 to read and write data from and in the storage system 10. The storage controller 120 uses the channel adapters 121, 122 to interpret the foregoing requests, and uses the storage adapters 125, 126 to read and write data of the flash memory modules 151 to 154, 161 to 164, 171 to 174, 181 to 184 in order to satisfy the requests.

Thereupon, the cache memories 123, 124 are used to temporarily store data received from the channel adapters 121, 122 or the storage adapters 125, 126, and to permanently store specific received data as needed. The cache memories 123, 124, for example, are dynamic random access memories, and are able to read and write data at high speed. The shared memory 129 stores a table for managing the stored data of the cache memories 123, 124, and the channel adapters 121, 122 or the storage adapters 125, 126 can refer to and set such table. The shared memory 129, for example, is a dynamic random access memory, and is able to read and write data at high speed.

The storage adapter 125 is connected to the flash memory modules 151 to 154, 161 to 164, 171 to 174, 181 to 184. Specifically, the storage adapter 125 is connected to the flash memory modules 151 to 154 via the channel 140. Further, the storage adapter 125 is connected to the flash memory modules 161 to 164 via the channel 141. Moreover, the storage adapter 125 is connected to the flash memory modules 171 to 174 via the channel 142. In addition, the storage adapter 125 is connected to the flash memory modules 181 to 184 via the channel 143.

Similarly, the storage adapter 126 is connected to the flash memory modules 151 to 154, 161 to 164, 171 to 174, 181 to 184. Specifically, the storage adapter 126 is connected to the flash memory modules 151 to 154 via the channel 144. Further, the storage adapter 126 is connected to the flash memory modules 161 to 164 via the channel 145. Moreover, the storage adapter 126 is connected to the flash memory modules 171 to 174 via the channel 146. In addition, the storage adapter 126 is connected to the flash memory modules 181 to 184 via the channel 147.

The channel adapters 121, 122 and the storage adapters 125, 126 are connected to the maintenance terminal 130. The maintenance terminal 130 sends the configuration information input by the administrator of the storage system 10 to the channel adapters 121, 122 and/or the storage adapters 125, 126.

Incidentally, the storage system 10 may also comprise one adapter in substitute for the storage adapter 125 and the channel adapter 121. Here, the one adapter will perform the processing of the storage adapter 125 and the channel adapter 121.

Reference numerals 190 to 193 represent RAID (Redundant Arrays of Inexpensive Disks) groups. For instance, the RAID group 190 is configured from the flash memory modules 151, 161, 171, 181. When an error occurs in one of the flash memory modules; for instance, the flash memory module 151 belonging to the RAID group 190 and it is not possible to read data from such defective flash memory module, data can be reconfigured from the other memory modules 161, 171, 181 belonging to the flash RAID group 190.

Figure 2:
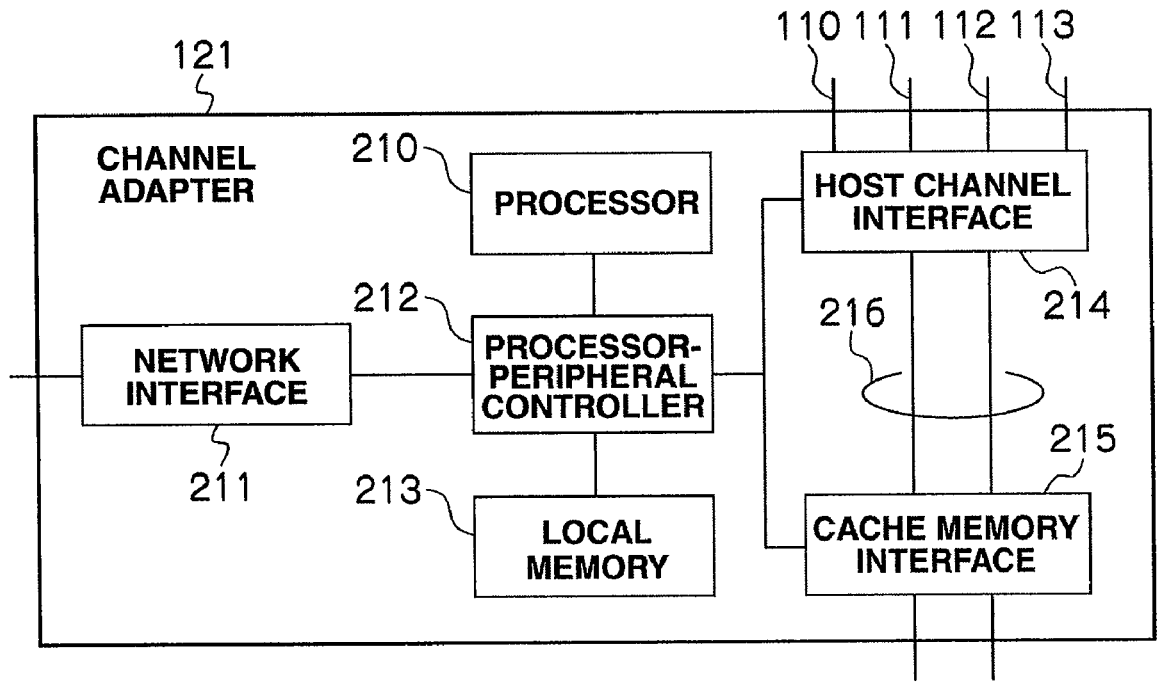
FIG. 2 is a diagram showing the internal configuration of a channel adapter configuring the storage system according to the present invention.

FIG. 2 is a diagram showing the hardware configuration of the channel adapter 121. The channel adapter 121 comprises a host channel interface 214, a cache memory interface 215, a network interface 211, a processor 210, a local memory 213, and a processor peripheral controller 212.

The host channel interface 214 is an interface for connecting the channel adapter 121 to the host computer 100 via the channels 110, 111, 112, 113. The host channel interface 214 mutually converts the data transfer protocol in the channels 110, 111, 112, 113 and the data transfer protocol in the storage controller 120.

The cache memory interface 215 is an interface for connecting the channel adapter 121 to the interconnection networks 127, 128.

The network interface 211 is an interface for connecting the channel adapter 121 to the maintenance terminal 130.

Incidentally, the host channel interface 214 and the cache memory interface 215 are connected via a signal line 216.

The processor 210 performs various types of processing by executing programs stored in the local memory 213. Specifically, the processor 210 controls the transfer of data between the host computer 100 and the interconnection networks 127, 128.

The local memory 213 stores programs to be executed by the processor 210. Further, the local memory 213 stores tables that are referred to by the processor 210. The tables referred to by the processor 210 contain configuration information for controlling the operation of the channel adapter 121, and are set or changed by the administrator. In the foregoing case, the administrator inputs information concerning the setting or changing of the table into the maintenance terminal 130. The maintenance terminal 130 sends the input information to the processor 210 via the network interface 211. The processor 210 creates or changes the tables based on the received information. The processor 210 further stores the tables in the local memory 213.

The processor peripheral controller 212 controls the transfer of data among the host channel interface 214, the cache memory interface 215, the network interface 211, the processor 210, and the local memory 213. The processor peripheral controller 212, for instance, is a chipset or the like.

Incidentally, since the hardware configuration of the channel adapter 122 and the hardware configuration of the channel adapter 121 are the same, explanation of the hardware configuration of the channel adapter 122 is omitted.

Figure 3:
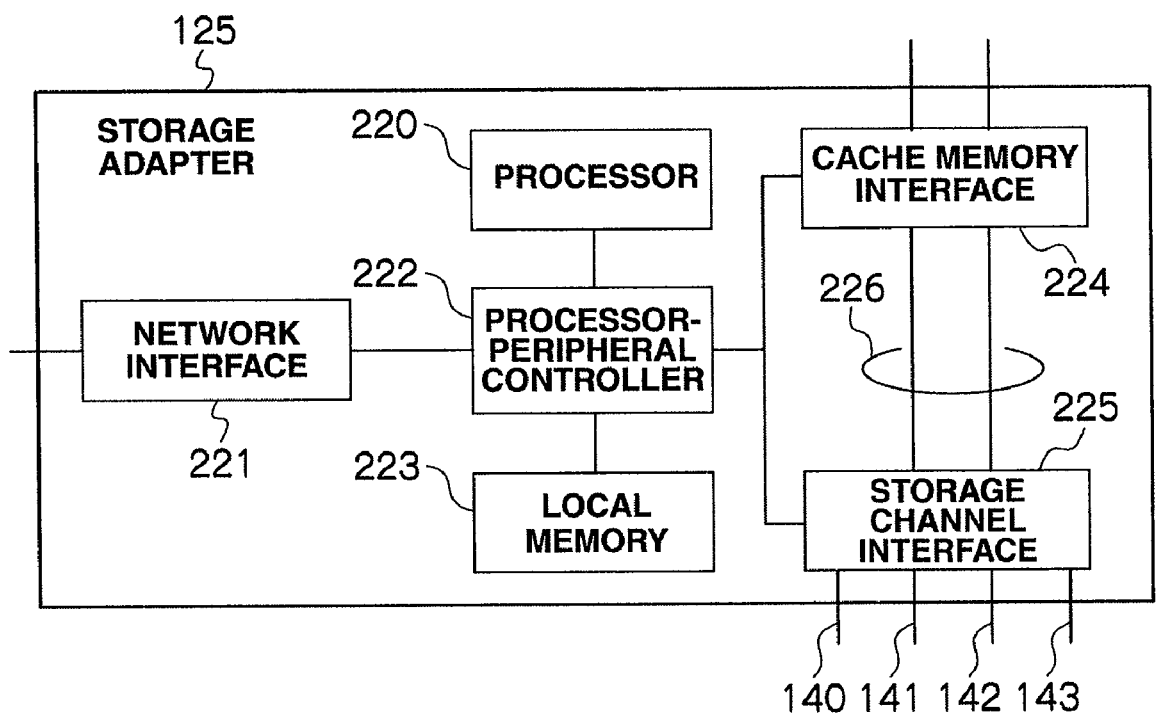
FIG. 3 is a diagram showing the internal configuration of a storage adapter configuring the storage system according to the present invention.

FIG. 3 is a diagram showing the hardware configuration of the storage adapter 125. The storage adapter 125 comprises a cache memory interface 224, a storage channel interface 225, a network interface 221, a processor 220, a local memory 223, and a processor peripheral controller 222.

The cache memory interface 224 is an interface for connecting the storage adapter 125 to the interconnection networks 127, 128.

The storage channel interface 225 is an interface for connecting the storage adapter 125 to the channels 140, 141, 142, 143. The storage channel interface 225 mutually converts the data transfer protocol in the channels 140, 141, 142, 143 and the data transfer protocol in the storage controller 120.

Incidentally, the cache memory interface 224 and the storage channel interface 225 are connected via a signal line 226.

The network interface 221 is an interface for connecting the storage adapter 125 to the maintenance terminal 130.

The processor 220 performs various types of processing by executing programs stored in the local memory 223.

The local memory 223 stores programs to be executed by the processor 220. Further, the local memory 223 stores tables that is referred to by the processor 220. The tables referred to by the processor 220 contain configuration information for controlling the operation of the storage adapter 125, and are set or changed by the administrator. In the foregoing case, the administrator inputs information concerning the setting or changing of the table into the maintenance terminal 130. The maintenance terminal 130 sends the input information to the processor 220 via the network interface 221. The processor 220 creates or changes the tables based on the received information. The processor 220 further stores the tables in the local memory 223.

The processor peripheral controller 222 controls the transfer of data among the cache memory interface 224, the storage channel interface 225, the network interface 221, the processor 220, and the local memory 223. The processor peripheral controller 222, for instance, is a chipset or the like.

Incidentally, since the hardware configuration of the storage adapter 126 and the hardware configuration of the storage adapter 125 are the same, explanation of the hardware configuration of the storage adapter 126 is omitted.

Figure 4:
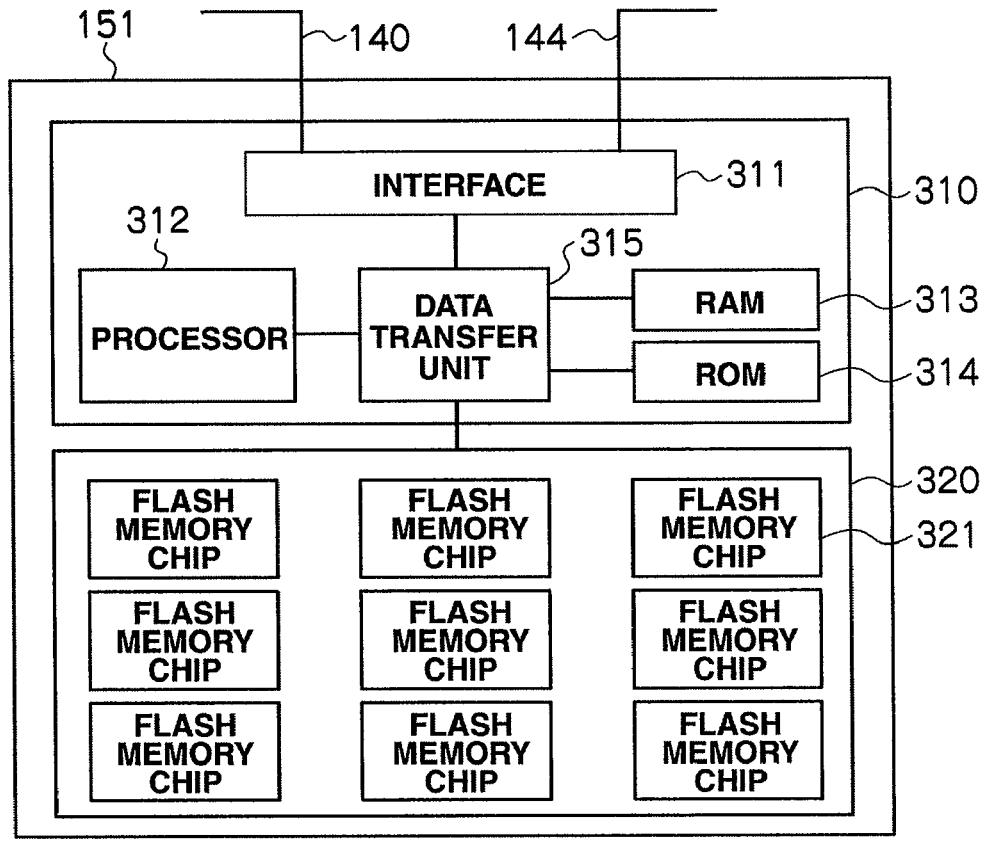
FIG. 4 is a diagram showing the internal configuration of a flash memory module configuring the storage system according to the present invention.

FIG. 4 is a diagram showing the hardware configuration of the flash memory module 151. The flash memory module 151 comprises a memory controller 310 and a flash memory 320. The flash memory 320 stores data. The memory controller 310 controls the "reading," "writing," and "deletion" of data of the flash memory 320.

The memory controller 310 comprises a processor 312, an interface 311, a data transfer unit 315, a RAM 313, and a ROM 314. The flash memory 320 comprises a plurality of flash memory chips 321.

Figure 5:
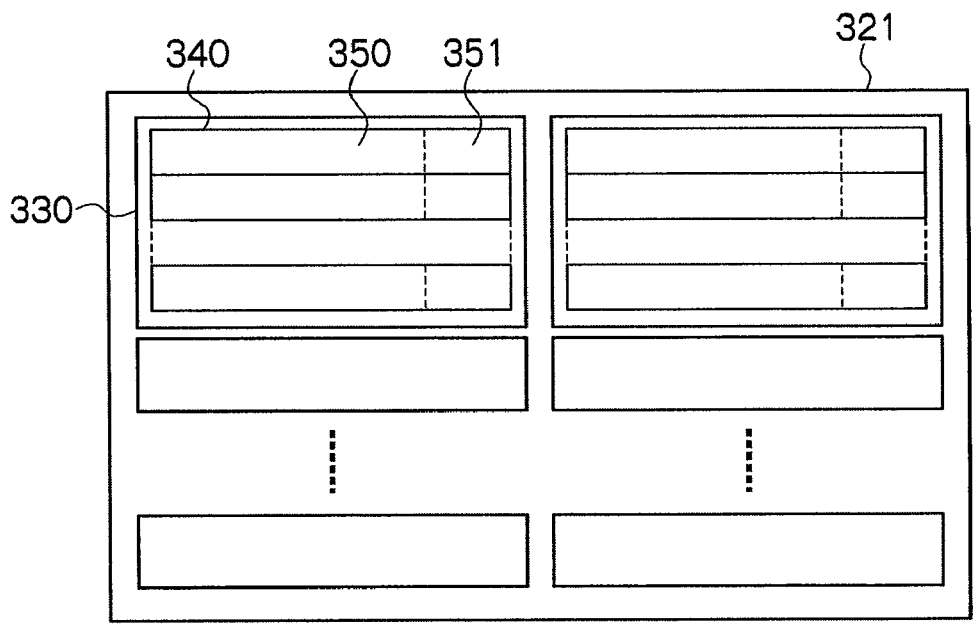
FIG. 5 is a diagram showing the configuration of a flash memory chip mounted on the flash memory module configuring the storage system according to the present invention.

FIG. 5 is a diagram showing the internal configuration of the flash memory chip 321. The flash memory chip 321 includes a plurality of blocks 330, and stores data in the respective blocks 330. The block 330 is the unit (basis) for the memory controller 310 to delete data. The block 330 includes a plurality of pages 340. The page 340 is the unit (basis) for the memory controller 310 to read and write data. With the flash memory 320, data is read in the amount of time of roughly 20 μs per page. Further, data is deleted in the amount of time of roughly 1.5 ms per block. The time required to write data in the pages of the flash memory 320 is longer than the time required to write equal-sized data in the cache memories 123, 124. Incidentally, the writing and deletion of data will gradually deteriorate the memory cells, and an error may occur when rewriting is performed numerous times (for example, several ten thousand times).

The pages 340 are classified as a valid page, an invalid page, an unwritten page, or a defective page by the memory controller 310. A valid page is the page 330 storing valid data that needs to be stored in the storage system 10. An invalid page is the page 340 storing invalid data (garbage) that no longer needs to be stored in the storage system 10. An unwritten page is the page 340 that has not stored data since the block 330 to which it belongs has been erased. A defective page is the page 340 that cannot be physically rewritten due to reasons such as the memory elements in the page 340 being damaged. There are three factors for the pages 340 to become a defective page.

The first factor is the rejection in the inspection at the chip manufacturing stage. The second factor is that an error occurs during the writing in the page 340. Incidentally, it will only be possible to read data from the defective page thereafter. A block 330 containing even one such page is referred to as a defective block, and the erasure of blocks and writing of pages are disabled. The third factor is that an error occurs during the erasure of the block 330. Incidentally, all pages in this block will become defective pages. This block is referred to as a defective block, and the erasure of blocks and writing of pages are disabled.

The interface 311 is connected to the storage adapter 125 in the storage controller 120 via the channel 140. Further, the interface 311 is connected to the storage adapter 126 in the storage controller 120 via the channel 144. The interface 311 receives commands from the storage adapter 125 and the storage adapter 126. Commands from the storage adapter 125 and the storage adapter 126, for example, are SCSI commands.

Specifically, the interface 311 receives data from the storage adapter 125 and the storage adapter 126. Then, the interface 311 buffers the received data in the RAM 313. Further, the interface 311 sends the data buffered in the RAM 313 to the storage adapter 125 and the storage adapter 126.

Moreover, the interface 311 has an interface function that is compatible with hard disk drives. Thus, the storage adapters 125, 126 recognize the flash memory modules 151 to 184 as hard disk drives. The storage system 10 may be equipped with a combination of flash memory modules and hard disk drives as the recording medium for storing data.

The RAM 313, for instance, is a dynamic random access memory, and is able to read and write data at high speed. The RAM 313 temporarily stores data to be sent and received by the interface 311. Meanwhile, the ROM 314 is a nonvolatile memory, and stores programs to be executed by the processor 312. The programs to be executed by the processor 312 are loaded from the ROM 314 into the RAM 313 when the storage system 10 is booted so that they can be executed by the processor 312. Further, the RAM 313 stores management information that is referred to by the processor 312.

The management information referred to by the processor 312 includes an address translation table for converting the logical page address and the physical page address of the flash memory 320. The logical page address is an address for logically designating a page as a unit for reading and writing data from and in the flash memory 320 from the outside (for instance, from the storage adapter 125) of the flash memory module 151. The physical page address is an address for the memory controller 310 to physically access a page as a unit for reading and writing data from and in the flash memory 320. The processor 312 rewrites the contents of the address translation table according to changes in the page correspondence. Incidentally, a specific example of the address translation table will be described later.

Further, this management information includes a page status table for managing the status of the physical pages 340 of the flash memory 320. The page status table stores predefined page statuses that are encoded. The page status is defined in the following 4 patterns in hexadecimal.

Status=0 . . . valid page
Status=8 . . . invalid page
Status=9 . . . defective page
Status=F . . . unwritten page The page status table retains statuses in block units. For example, when the page status of a certain block is "880F," this represents that the first and second pages contain invalid data, the third page contains valid data, and the fourth page is unwritten. The processor 312 rewrites the contents of the page status table according to changes in the page status. Incidentally, a specific example of the page information table will be described later.

The data transfer unit 315, for instance, is a switch, and mutually connects the processor 312, the interface 311, the RAM 313, the ROM 314 and the flash memory 320, and controls the transfer of data among the foregoing components.

The processor 312 performs various types of processing by executing programs stored in the RAM 313. For example, the processor 312 refers to the address translation table stored in the RAM 313, converts the logical page address of the flash memory 320 and the physical page address of the flash memory 320, and reads and writes data from and in the flash memory 320. Further, the processor 312 performs garbage collection processing (block reconstruction processing) to the blocks in the flash memory module 151.

The garbage collection processing (block reconstruction processing) is processing for reconstructing an invalid page in a certain block 330 as an unwritten page for increasing the unwritten page count when the number of unwritten pages for writing new data becomes few. As the block (target block) 330 to be subject to garbage collection processing, a block with the most invalid pages is selected. Although it is necessary to erase the invalid pages in order to increase the number of unwritten pages, since erasure can only be performed in block units, the processor 312 copies data of a valid page to a certain block of an unwritten page, and thereafter erases the target block and reconstructs the block. Like this, data written in the flash memory module 151 can be migrated to the flash memory module 151 independent to commands from the storage controller 120. The memory controller 310 accurately reflects the results of this data migration to the address translation table and the page status table. Thereby, the storage controller 120 is able to access the correct data.

The processor 312 uses the address translation table and the page status table, respectively, to manage the correspondence and the page status of the logical page address and the physical page address that changes based on the page writing or garbage collection processing in the flash memory 320.

Incidentally, although the hardware configuration of the flash memory module 151 was described in detail above, the other flash memory modules 152 to 184 have the same hardware configuration. Thus, the illustration and explanation of the other flash memory modules 152 to 184 are omitted.

As shown in FIG. 5, each of the plurality of pages 340 configuring the respective blocks includes a data unit 350 and a redundancy unit 351. For example, for each page, the page 340 is 2112 bytes, the data unit 350 is 2048 bytes, and the redundancy unit 351 is 64 bytes. Incidentally, there is no particular limitation on these page sizes in the present invention.

The data unit 350 stores user data. The redundancy unit 351 stores the logical page address, write time, and error correction code corresponding to the page 340 itself. The logical page address is referred to when creating an address translation table in the RAM 313 at the time of booting the storage system 10, or when performing garbage collection processing. The write time is referred to for determining whether the page 340 is a valid page or an invalid page upon creating a page status table in the RAM 313 at the time of booting the storage system 10. When there are a plurality of pages recording the same logical page address, pages with the oldest time is a valid page, and the remaining pages are invalid pages. The error correction code is information for detecting and correcting an error of the pages 340, and, for instance, is a BCH (Bose-Chaud-huri-Hocquenghem) code. The redundancy unit 351 is normally accessible only by the memory controller 310, and the storage adapters 125, 126 are only able to access the contents of the data unit 350.

(2) Selection of Defective Block Substitution Method and Influence Thereof

FIG. 6 to FIG. 9 are diagrams explaining the two types of block substitution methods to be performed when a defective block is discovered in a plurality of blocks configuring the flash memory chip 321, and the influence of the respective methods on the write performance in the flash memory modules 151 to 154, 161 to 164, 171 to 174 and 181 to 184 and the hit probability of the cache memory 123.

In order to simplify the explanation, the number of blocks and the number of pages in such blocks is set to be less than a standard flash memory chip. In other words, 7 blocks are used to read and write user data, and each block is configured from 4 pages. Further, the logical pages storing user data will be the 12 pages (3 blocks worth) of A to L. That is, in the initial state, 4 blocks are used as the backup extent to be used for the stored data update control. Incidentally, pages with a diagonal line in FIG. 6 to 8 are invalid pages, and the blank pages are unwritten pages.

Figure 6:
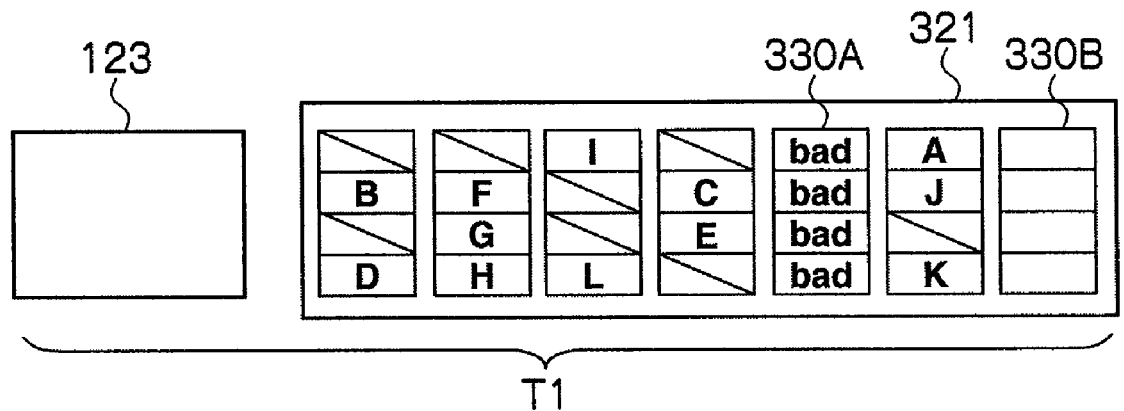
FIG. 6 is a diagram explaining the influence caused by the difference in the method of substituting the defective block generated in the flash memory according to the present invention.

FIG. 6 shows T1 representing the flash memory chip 321 and the cache memory 123. As illustrated in FIG. 6, T1 shows a state where one block in the flash memory chip 321 is defective, and the second defective block is about to be generated. The defective block is the block 330A where "bad" is shown in all 4 pages. This first defective block 330A is substituted in the flash memory 321. Thus, the backup extent is changed from 4 blocks to 3 blocks. Further, the number of remaining unwritten pages is the 4 pages of the block 330B, and this is a state requiring garbage collection.

At this point in time, 12 logical pages are arranged in the 24 available physical pages (6 blocks worth). Therefore, redundancy of the logical pages of the flash memory 320 will be $^{24}/_{12}$=200 percent (%). Moreover, since 12 valid pages are included in the 20 physical pages excluding the 4 unwritten pages, the average invalid page content will be $^{8}/_{20}$=40% (1.6 pages per block). Accordingly, the valid pages to be saved in other blocks during garbage collection will be an average of 60% (2.4 pages per block).

Figure 7:
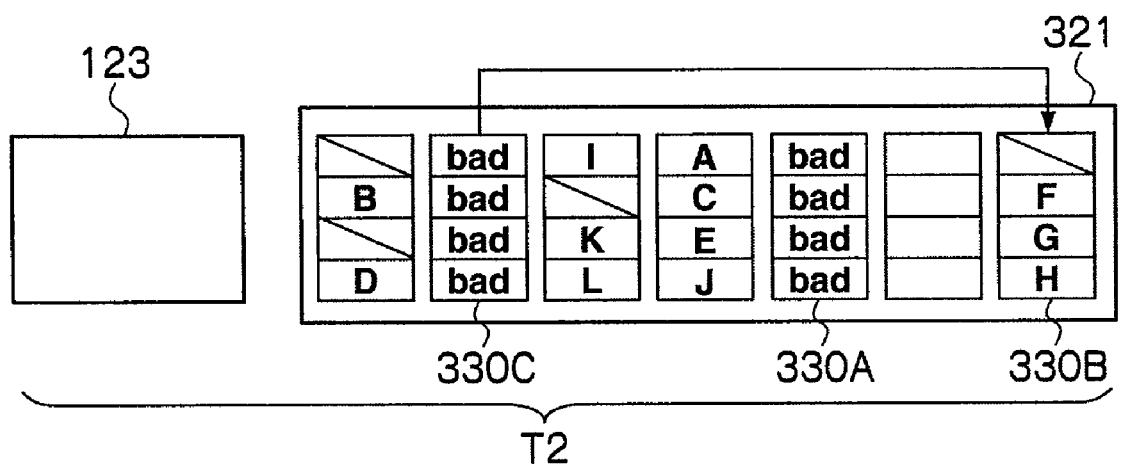
FIG. 7 is a diagram explaining the influence caused by the difference in the method of substituting the defective block generated in the flash memory according to the present invention.
Figures 8, 9:
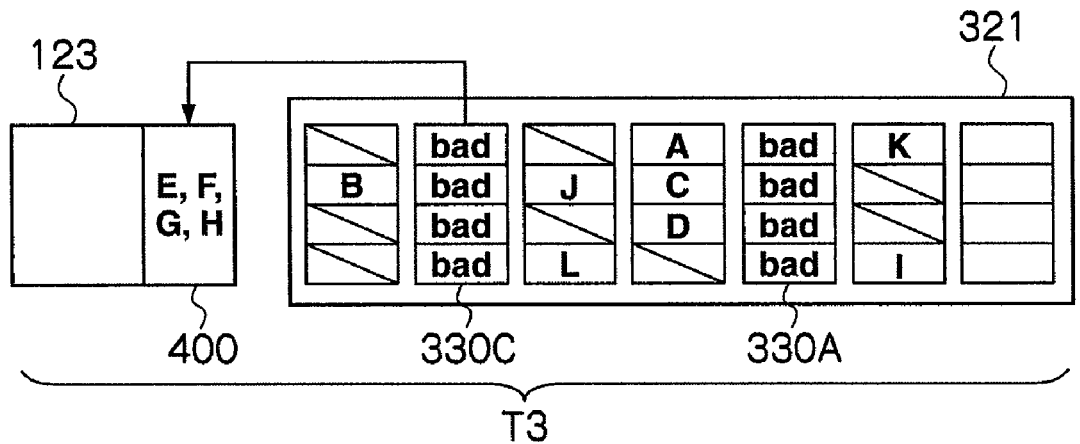
FIG. 8 is a diagram explaining the influence caused by the difference in the method of substituting the defective block generated in the flash memory according to the present invention.
FIG. 9 is a diagram explaining the influence caused by the difference in the method of substituting the defective block generated in the flash memory according to the present invention.

FIG. 7 shows T2 representing the flash memory chip 321 and the cache memory 123. As illustrated in FIG. 7, T2 shows a state where the two blocks 330A, 330C in the flash memory chip 321 are defective. The second defective block is the block 330C where "bad" is shown in all 4 pages. As with the first defective block 330A, the second defective block 330C is also substituted with the block 330B in the flash memory 320. Thus, the backup extent is changed from 4 blocks to 2 blocks. Further, the number of remaining unwritten pages is 4 pages, and this is a state requiring garbage collection.

At this point in time, 12 logical pages are arranged in the 20 available physical pages (5 blocks worth). Therefore, redundancy of the logical pages of the flash memory 320 will be $^{20}/_{12}$=167%. Moreover, since 12 valid pages are included in the 16 physical pages excluding the 4 unwritten pages, the average invalid page content will be $^{4}/_{16}$=25% (1 page per block). Accordingly, the valid pages to be saved in other blocks during garbage collection will be an average of 75% (3 pages per block). Thus, the valid page save volume during garbage collection will increase in comparison to the case illustrated in FIG. 6, and the write performance of the flash memory module 151 will deteriorate. Incidentally, since the capacity of the available cache memory 123 will be the same as the case illustrated in FIG. 6, the cache hit probability of the storage system 10 will remain unchanged.

FIG. 8 shows T3 representing the flash memory chip 321 and the cache memory 123. As illustrated FIG. 8, T3 shows a state where the two blocks 330A, 330C in the flash memory chip 321 are defective. Although the first defective block 330A is substituted in the flash memory 320, the second defective block 330C is substituted with a partial extent 400 in the cache memory 123. The 4 logical page data of E to H substituted in the partial extent 400 of the cache memory 123 exist only in the cache memory 123, and have been deleted from the flash memory 320. Thereby, the logical pages storing user data will be the 8 pages (2 blocks worth) of A to D and I to L. Thus, the backup extent is changed from 4 blocks to 3 blocks. Further, the number of remaining unwritten pages is 4 pages, and this is a state requiring garbage collection.

At this point in time, 8 logical pages are arranged in the 20 available physical pages (5 blocks worth). Therefore, redundancy of the logical pages of the flash memory 320 will be $^{20}/_{8}$=250%. Moreover, since 8 valid pages are included in the 16 physical pages excluding the 4 unwritten pages, the average invalid page content will be $^{8}/_{16}$=50% (2 pages per block). Accordingly, the valid pages to be saved in other blocks during garbage collection will be an average of 50% (2 pages per block). Thus, the valid page save volume during garbage collection will decrease in comparison to the case illustrated in FIG. 6, and the write performance of the flash memory module 151 will improve. Incidentally, since the capacity of the available cache memory 123 will decrease in the quantity of 4 logical page data, the cache hit probability of the storage system 10 will deteriorate in comparison to the case of T1 illustrated in FIG. 6.

FIG. 9 is a table T4 that summarizes the foregoing explanation. As shown in FIG. 9, in the table T4, the item name T41 is associated with the results T41 to T43 in T1 to T3. The item name T41 contains the item names of redundancy of the logical page of the flash memory, invalid page content (average) during garbage collection, valid page migration volume (average) during garbage collection, write performance of flash memory, and hit probability of cache memory. Redundancy of the logical page of the flash memory is T41 (200%), T42 (167%), and T43 (250%). The invalid page content (average) during garbage collection is T41 (40%), T42 (25%), and T43 (50%). The valid page migration volume during garbage collection is T41 (60%), T42 (75%), and T43 (50%). Further, the write performance of the flash memory 320 deteriorates in the case of T42, and improves in the case of T43. The hit probability of the cache memory 123 remains unchanged in the case of T42, but deteriorates in the case of T43.

As shown in FIG. 9, when the flash memory 320 is selected as the substitute destination of the defective block 330C, there is a drawback in that the write performance of the storage system 10 will deteriorate. Meanwhile, when the cache memory 123 is selected as the substitute destination of the defective block 330C, although there is an advantage in that the write performance of the storage system 10 will improve, there is a drawback in that the cache hit probability will deteriorate. Deterioration of the cache hit probability means that the frequency of write-back from the cache memory 123 to the flash memory 320 caused by a mishit will increase. As described above, the time required for writing data in the pages of the flash memory 320 is longer than the time required to write equal-sized data in the cache memory 123. Therefore, deterioration of the cache hit probability will consequently deteriorate the write performance of the storage system 10.

The pros and cons of selecting the cache memory 123 as the substitute destination of the defective block 330C are of a trade-off relationship, and the write performance of the storage system will improve or deteriorate depending on the access pattern to the flash memory 320 of the host computer 100. For instance, during random writing, since the availability of the cache memory 123 is low, it would be better to improve the write performance of the flash memory module 151, and it would be more advantageous to select the cache memory 123 as the substitute destination of the defective block (for instance, 330C). Further, for instance, in partial concentrated writing, since the availability of the cache memory 123 is high, it would be better to maintain the hit probability without reducing the capacity of the available cache memory 123, and it would be more advantageous to select the flash memory 320 as the substitute destination of the defective block (for instance, 330C).

The storage system 10 applying the present invention estimates the write performance of the storage system 10 upon selecting the cache memory 123 as the substitute destination of the defective block based on the access pattern of the host computer 100, and selects the cache memory 123 as the substitute destination of the defective block when it is determined that the write performance of the storage system 10 will improve. Contrarily, when it is determined that the write performance of the storage system 10 will deteriorate, the flash memory 320 is selected as the substitute destination of the defective block as with conventional technology. This processing will be explained later.

(3) Management Means of Cache Memory and Flash Memory

Figure 10:
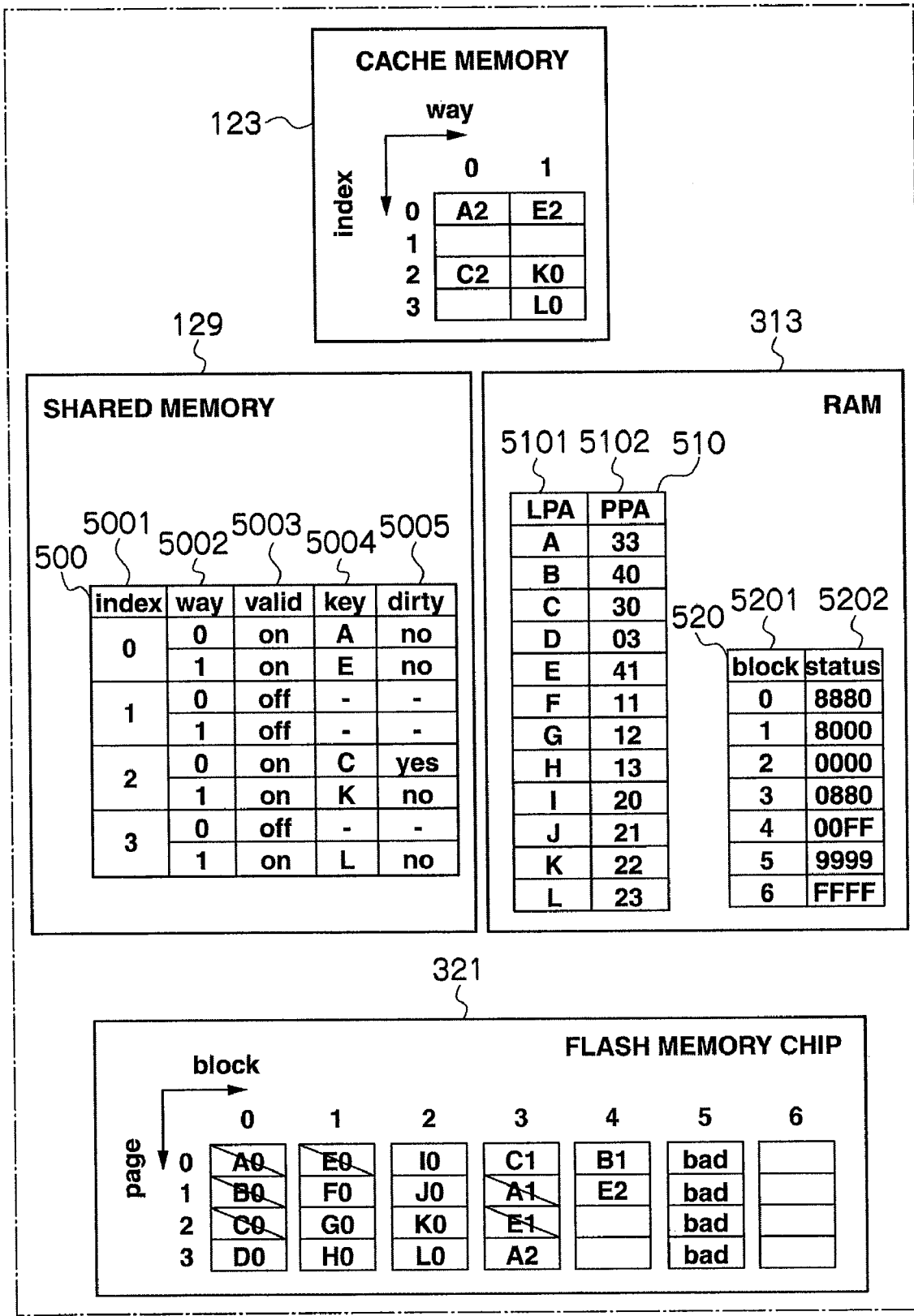
FIG. 10 is a diagram explaining the management of the cache memory and the flash memory chip according to the present invention.
Figure 11:
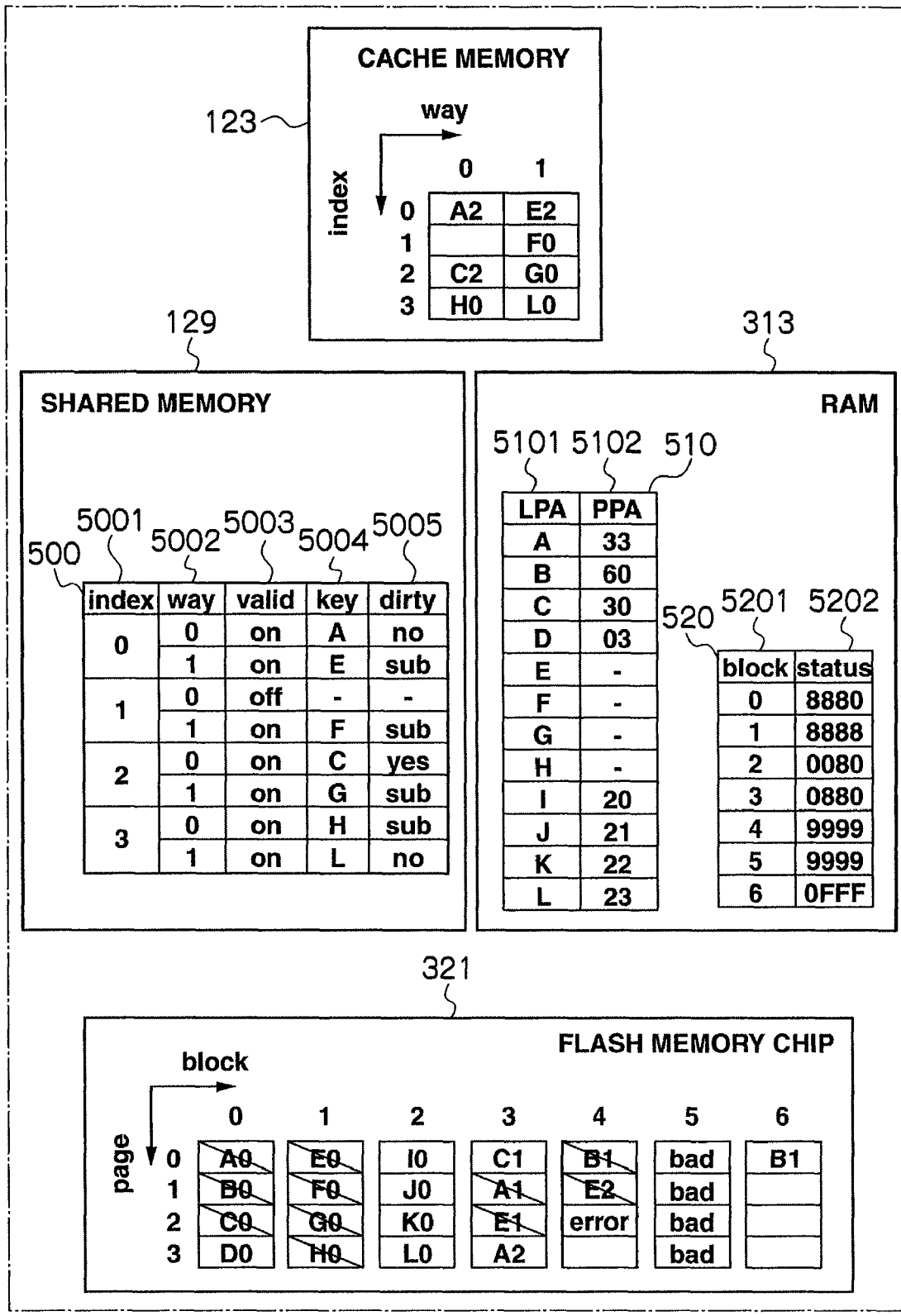
FIG. 11 is a diagram explaining the management of the cache memory and the flash memory chip according to the present invention.

The management means of the cache memory 123 and the flash memory chip 321 in the storage system 10 are now explained with reference to FIG. 10 and FIG. 11. FIG. 10 and FIG. 11 are diagrams explaining the contents stored in the cache memory 123, the shared memory 129, the RAM 313 and the flash memory chip 321 for explaining the foregoing management means. Incidentally, since the same applies to the cache memory 124 and the other flash memory chips, explanation of the cache memory 124 and the other flash memory chips is omitted.

In order to simplify the explanation, as with the case illustrated in FIG. 6 to FIG. 9, 7 blocks are used to read and write user data, and each block is configured from 4 pages. Further, the logical pages storing user data will be the 12 pages (3 blocks worth) of Ax to Lx. Here, x represents an integer that is 0 or greater, and shows the number of times each logical page has been updated. For example, E2 represents data of the logical page E that has been updated twice. As with the case illustrated in FIG. 6 to FIG. 9, pages with a diagonal line are invalid pages, and the blank pages are unwritten pages. Further, the management method of the cache memory 123 is a 2-way set associate system on the basis of the page size of the flash memory 320. In this system, one way has four indexes 0 to 3, the logical pages A, E, I use two entries of index=0, the logical pages B, F, J use two entries of index=1, the logical pages C, G, K use two entries of index=2, and the logical pages D, H, L use two entries of index=3. Incidentally, there is no particular limitation on the management method of the cache memory 123 in the present invention.

As shown in FIG. 10 and FIG. 11, the shared memory 129 includes a cache management table 500 for managing the cache memory 123. The RAM 313 in the flash memory module 151 includes an address translation table 510 and a page status table 520 for managing the flash memory chip 321. Incidentally, FIG. 10 shows a state where the fifth block became defective, and such block being substituted in the flash memory chip 321. Further, FIG. 11 shows a state where a write error occurred during the writing of data in the second page of the fourth block from the state shown in FIG. 10, the fourth block became the second defective block, and a part of the cache memory 123 is used as the substitute destination thereof.

As shown in FIG. 10 and FIG. 11, the cache management table 500 manages the usage state of a total of eight entries; namely, four indexes 5001 and two ways 5002 for each index. Each entry has a valid flag 5003, a key register 5004, and a dirty register 5005. The valid flag 5003 records whether the entry is in use, and is defined as follows.

Valid=on: in use

Valid=off: empty

The key register 5004 records the logical pages of cache data stored in that entry. The dirty register 5005 records whether the cache data of that entry is newer than the data in the flash memory 320, or whether that entry is being used as a substitute of the defective block of the flash memory chip 321, and this is defined as follows.

Dirty=yes: update data that is newer than the flash memory 320 is retained

Dirty=no: original data that is the same as the flash memory 320 is retained

Dirty=sub: state of being used as a substitute destination

With the entry of dirty=yes, it is necessary to perform write-back to the flash memory 320 and attain synchronization before being used for a separate logical page. With the entry of dirty=sub, since there is no write-back destination in the flash memory 320, it must be managed such that it is not used for a separate logical page.

The address translation table 510 shown in FIG. 10 and FIG. 11 manages the correspondence status of the foregoing logical page address and the physical page address for converting these addresses. The address translation table 510 is configured based on the correspondence of the LPA 5101 and the PPA 5102. In this address translation table 510, LPA represents a logical page address and PPA represents a physical page address. Incidentally, the physical page address of the page number Y in the block number X is represented as XY.

The page status table 520 shown in FIG. 10 and FIG. 11 manages each page-status in block units as described above. In FIG. 10 and FIG. 11, the block 5201 represents the block number, and the status 5202 represents the page status of such block.

Changes in the cache management table 500, the address translation table 510, and the page status table 520 upon changing from the status illustrated in FIG. 10 to the status illustrated in FIG. 11 are now explained.

As the target logical pages to be managed only by the cache memory 123, for instance, the four logical pages E to H are selected.

Since the latest data E2 of the logical page E already exists in the cache memory 123 upon referring to the cache management table 500, the dirty register is set as the sub (substitute status) without transferring data.

Since the latest data F0 of the logical page F does not exist in the cache memory 123 upon referring to the cache management table 500, data is transferred to the empty entry of index=1, the valid flag is turned "on" (in use), and the dirty register is set to "sub" (substitute status).

Since the latest data G0 of the logical page G does not exist in the cache memory 123 upon referring to the cache management table 500, data is transferred to the entry of dirty="no" (original data retained) of the index=2 caching K0, the valid flag is turned "on" (in use), and the dirty register is set to "sub" (substitute status).

Since the latest data H0 of the logical page H does not exist in the cache memory 123 upon referring to the cache management table 500, data is transferred to the empty entry of index=3, the valid flag is turned "on" (in use), and the dirty register is set to "sub" (substitute status).

The cache management table 600 shown in FIG. 11 shows the results of the foregoing setting.

Subsequently, the physical page address 5102 corresponding to the logical pages E to H is searched in the address translation table 510, and the page status of that physical page is set to "8" (invalid) in the page status table 520. In other words, the column of the second block of the page status table 520 is set to "8888." Then, all physical page addresses corresponding to the logical pages E to H are cleared and set to the status of "no correspondence" in the address translation table 510. Incidentally, in the address translation table 510, a special value (for instance, "FFFFFFFF (hexadecimal)") signifying "no correspondence" is defined and this value is written in the RAM 313 in order to represent the "no correspondence" status. The value to be written in the RAM 313 can be any value so as long as it is a value that is outside the range of the logical page address to be actually used.

Subsequently, data of the valid page containing the fourth block that became defective is saved. In other words, the zeroth page B1 is copied to an unwritten page (for instance, zeroth page of sixth block). Since the copy destination page shows that it is a valid page, the column of the sixth block of the page status table 520 is set to "0FFF." Further, the PPA 5102 corresponding to the LPA 5101 "B" of the address translation table 510 is set to "60."

Since "E2" of the first page is managed only with the cache memory 123, it has already been saved, and is left as is.

Finally, since the fourth block is shown to be a defective block, the column of the status 5202 of the fourth block of the page status table 520 is set to "9999."

The address translation table 510 and the page status table 520 shown in FIG. 11 show the result of the foregoing setting.

(4) Processing Routing of Storage Controller 120 and Memory Controller 310

The detailed processing routine of the storage controller 120 and the memory controller 310 in the storage system 10 is now explained with reference to FIG. 12 to FIG. 16. The following explanation is based on the management means of the cache memory 123 and the flash memory 320 illustrated in FIG. 10 and FIG. 11.

Figure 12:
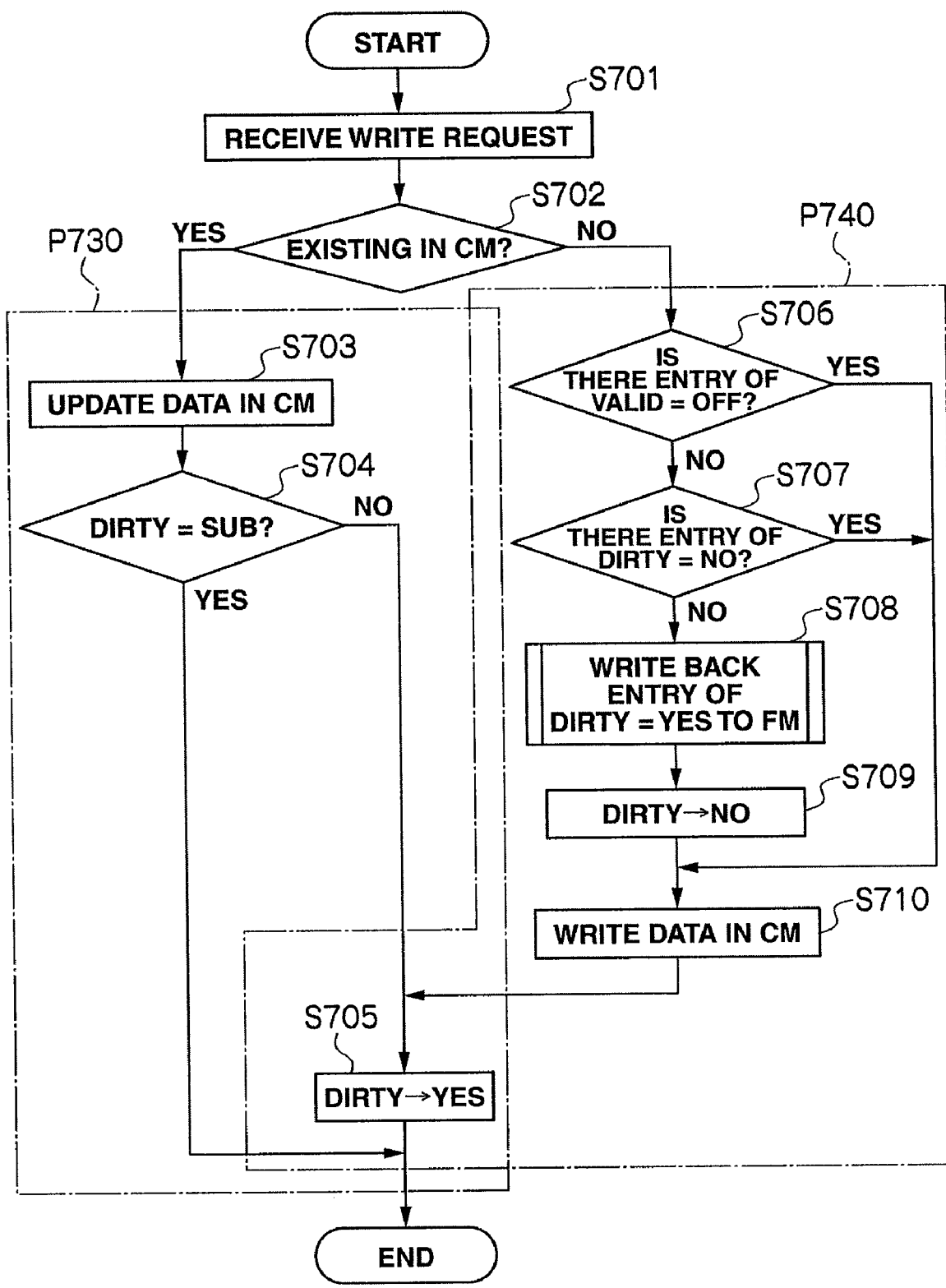
FIG. 12 is a flowchart showing the processing to be performed by the storage controller and the memory controller based on a data write request from a host computer according to the present invention.

FIG. 12 is a flowchart showing the processing to be performed by the storage controller 120 and the memory controller 310 regarding the data write request from the host computer 100. The processing routine is explained below.

Foremost, the storage controller 120 receives the logical page address and new data to be written as the write request (S701), and searches whether an entry including the data of the logical page address exists in the cache memory 123 using the cache management table 500 (S702).

If the result is true (existing) (S702: YES), the storage controller 120 updates the relevant data in the cache memory 123 using the received new data (S703), and thereafter searches whether the dirty register 5005 of that entry is a "sub (substitute status)" (S704). If this is true (S704: YES), the storage controller 120 ends the processing as is. If this if false (S704: NO), the storage controller 120 sets the dirty register 5005 to "yes" (update data retained) (S705), and thereafter ends the processing.

Meanwhile, if the result at step S702 is false (not existing) (S702: NO), the storage controller 120 searches whether an entry (empty entry) where the valid flag 5003 is "off" exists in the cache management table 500 (S706). If an empty entry exists (S706: YES), the received new data is written into the relevant entry (S710). Here, the storage controller 120 sets the valid flag 5003 of that entry to "on: (in use)."

Meanwhile, if an empty entry does not exist (S706: NO), the storage controller 120 searches whether an entry (original data retention entry) where the dirty register 5005 is "no" exists (S707). If an original data retention entry exists (S707: YES), since there is no problem in overwriting that entry, the routine proceeds to step S710 as with the case where the empty entry exists.

If an original data retention entry does not exist (S707: NO), the storage controller 120 performs write-back of the stored data of the entry (update data retention entry) where the dirty register 5005 is "yes" to the flash memory 320 (refer to S708 of FIG. 14), and sets the dirty register 5005 to "no" (S709). Thereby, since there is no problem in overwriting that entry, the routine proceeds to step S710 as with the case where the empty entry exists. Incidentally, for instance, an LRU (Least Recently Used) algorithm is used for selecting the entry to be subject to the write-back processing at step S708.

After step S710, the storage controller 120 sets the dirty register 5005 to "yes" (update data retained) (S705), and thereafter ends the processing.

Figure 13:
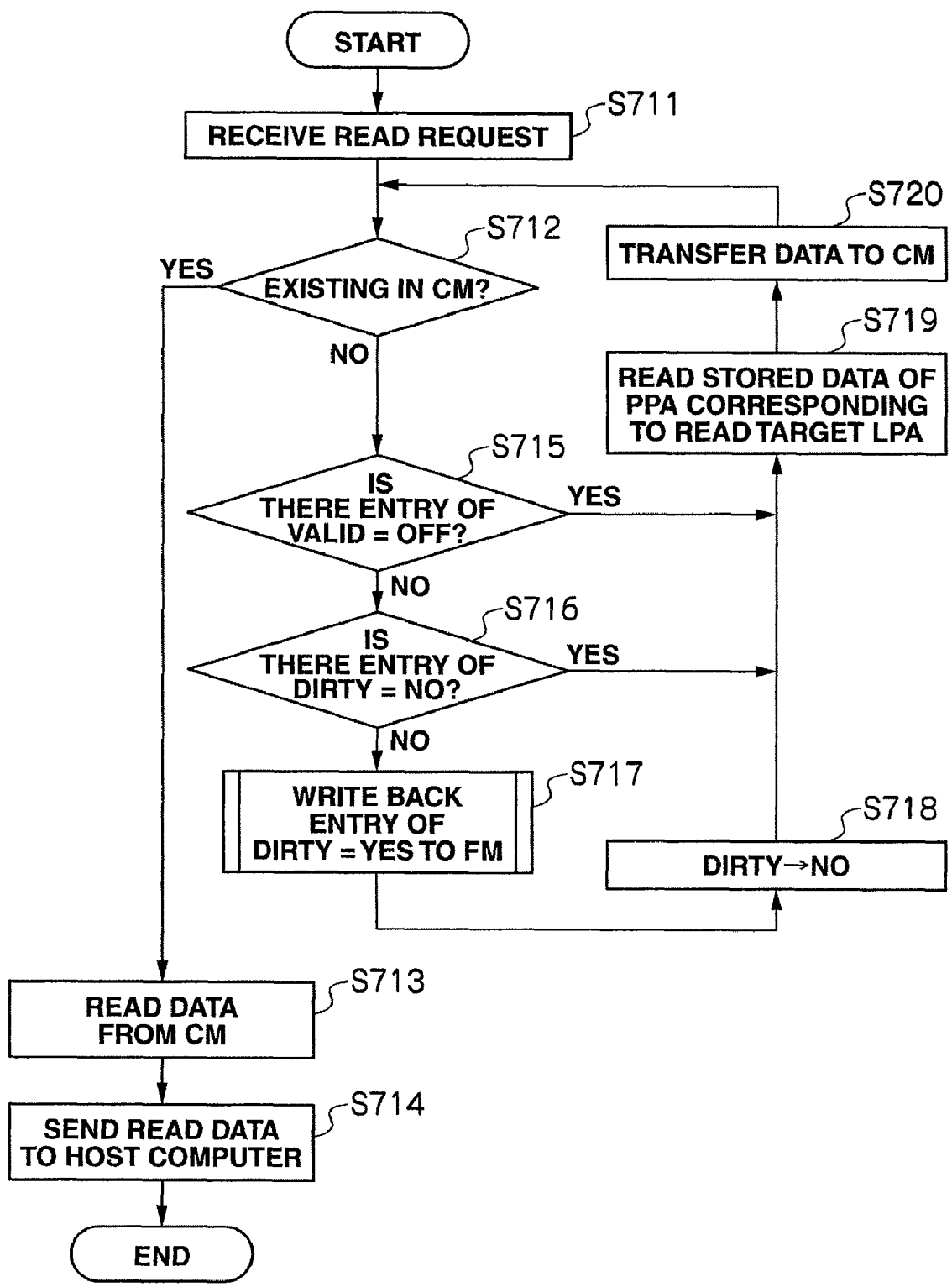
FIG. 13 is a flowchart showing the processing to be performed by the storage controller and the memory controller based on a data read request according to the present invention.

FIG. 13 is a flowchart showing the processing to be performed by the storage controller 120 and the memory controller 310 regarding the data read request from the host computer 100. The processing routine is explained below.

Foremost, the storage controller 120 receives a logical address to be read as the read request (S711), and searches whether an entry including data of the relevant logical page address exists in the cache memory 123 using the cache management table 500 (S712).

If the result is false (not existing) (S712: NO), the storage controller 120 searches whether an entry (empty entry) where the valid flag 5003 is "off" exists in the cache management table 500 (S715). If an empty entry exists (S715: YES), the logical page address of which flash memory module among the flash memory modules 151 to 154, 161 to 164, 171 to 174 and 181 to 184 is specified from the received logical address, the memory controller 310 searches for the corresponding physical page address 5102 using the address translation table 510, and reads the stored data of that page (S719). Then, the memory controller 310 transfers that data to the relevant entry of the cache memory 123 (S720). Here, the storage controller 120 sets the valid flag 5003 of that entry to "on" (in use), and sets the dirty register 5005 to "no" (original data retained). The routine thereafter returns to step S712.

Meanwhile, if an empty entry does not exist (S715: NO), the storage controller 120 searches whether an entry (original data retention entry) where the dirty register 5005 is "no" exists (S716). If an original data retention entry exists (S716: YES), since there is no problem in overwriting that entry, the routine proceeds to step S719 as with the case where the empty entry exists. If an original data retention entry does not exist (S716: NO), the storage controller 120 performs writeback of the stored data of the entry (update data retention entry) where the dirty register 5005 is "yes" to the flash memory 320 (refer to S717 of FIG. 14), and sets the dirty register 5005 to "no" (S718). Thereby, since there is no problem in overwriting that entry, the routine proceeds to step S719 as with the case where the empty entry exists. Incidentally, for instance, an LRU algorithm is used for selecting the entry to be subject to the write-back processing at step S717.

Meanwhile, when the result at step S712 is true (existing) (S712: YES), the storage controller 120 reads the relevant data in the cache memory 123 (S713), sends this data to the host computer 100 (S714), and thereafter ends this processing.

Figure 14:
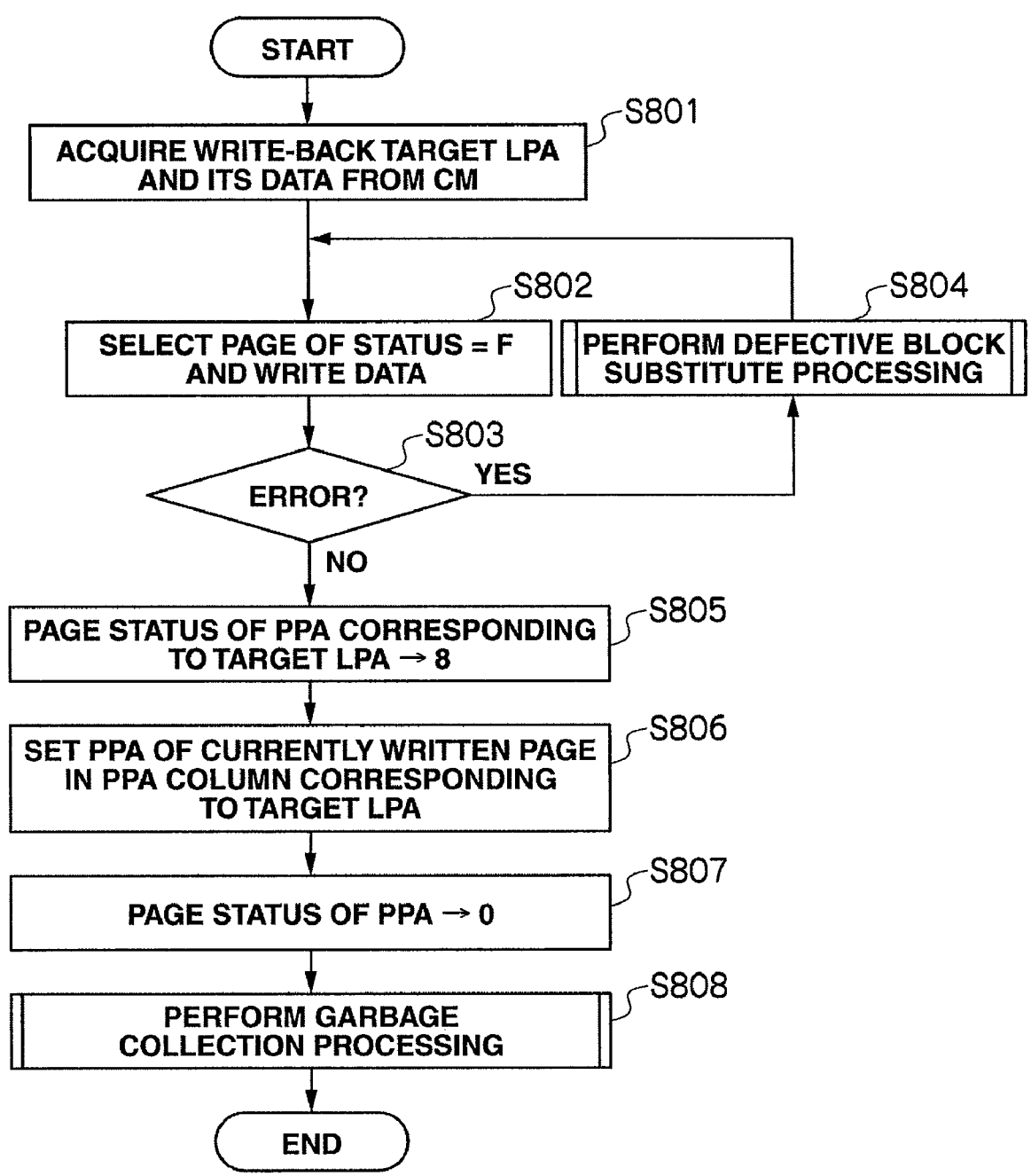
FIG. 14 is a flowchart showing the write-back processing of cache data to be performed by the memory controller according to the present invention.

FIG. 14 is a flowchart showing the detailed processing routine of the write-back processing S708 of cache data to be performed by the memory controller 310 in FIG. 12, the write-back processing S717 of cache data to be performed by the memory controller 310 in FIG. 13, and the write-back processing S905 of cache data to be performed by the memory controller 310 in FIG. 15 described later. The processing routine is described below.

Foremost, the memory controller 310 acquires the logical page address to be subject to write-back and its data from the cache memory 123 (S801). Then, the memory controller 310 uses the page status table 520 to select a page in which the status="F" (unwritten), and writes the acquired data in such page (S802). Subsequently, the memory controller 310 determines whether an error occurred during writing (S803). If the writing ended as an error (S803: YES), the memory controller 310 performs defective block substitute processing (S804), and returns to step S802. Details of the defective block substitute processing will be explained later with reference to FIG. 15.

Meanwhile, if the writing is successful (S803: NO), the memory controller 310 uses the address translation table 510 to search a physical page address (old address) 5102 corresponding to the logical page address 5101 to be subject to the write-back, and sets the status of the page shown by the old address in the page status table 520 to "8" (invalid) (S805).

Then, in the address translation table 510, the memory controller 310 sets an address (new address) of the physical page written at step S802 into the physical page address 5102 corresponding to the logical page address 5012 to be subject to write-back (S806). Further, the memory controller 310 sets the status of the page shown with the new address in the page status table 520 to "0" (valid) (S807). Finally, the memory controller 310 performs garbage collection processing (S808) to ensure a sufficient number of unwritten pages for the subsequent write-back, and thereafter ends the write-back processing.

Figure 15:
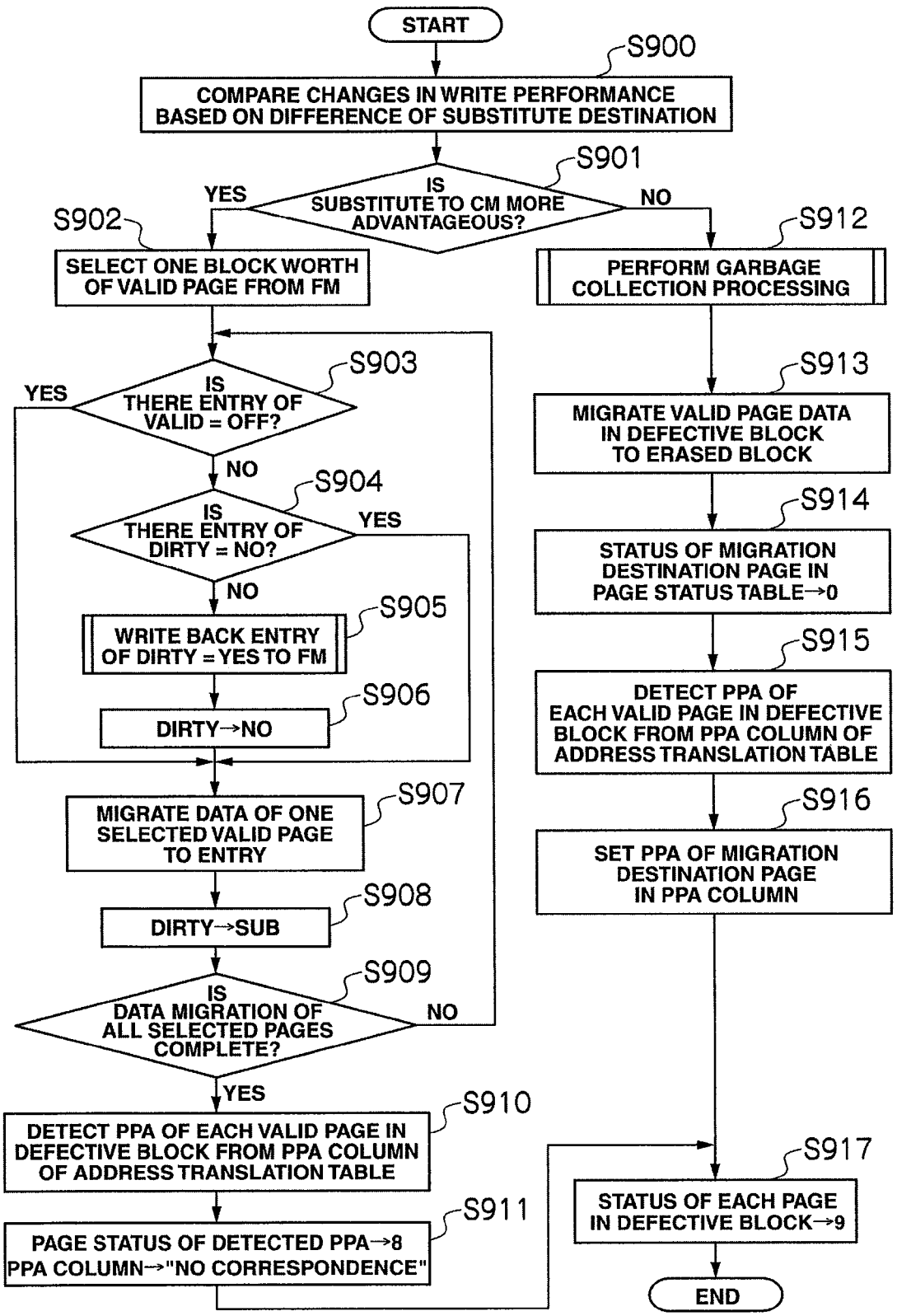
FIG. 15 is a flowchart showing the defective block substitute processing to be performed by the storage controller and the memory controller according to the present invention.

FIG. 15 is flowchart showing the detailed processing routine of the substitute processing of the defective block to be performed at step S804 by the storage controller 120 and the memory controller 310 in FIG. 14. The processing routine is explained below.

Foremost, the memory controller 310 estimates and compares the changes in the write performance of the storage system 10 in the case of selecting the cache memory 123 as the substitute destination of the defective block and in the case of selecting the flash memory 320 as the substitute destination of the defective block (S900). An example of estimating and comparing the write performance will be described later.

The memory controller 310 determines whether it would be more advantageous to select the cache memory 123 as the substitute based on the comparative result (S901). If it would be more advantageous to select the cache memory 123 as the substitute (write performance is higher) (S901: YES), the memory controller 310 performs the substitute processing (S902 to S911 and S917) to the cache memory 123, and, if not (S901: NO), performs the substitute processing (S912 to S917) to the flash memory 320.

As the substitute processing to the cache memory 123, foremost, the memory controller 310 uses the page status table 520 selects one block worth of valid pages (4 pages in the example of FIG. 6 to FIG. 11) from the flash memory chip 321 in which a defective block was generated (S902). The storage controller 120 searches whether an entry (empty entry) where the valid flag 5003 is "off" exists in the cache management table 500 (S903).

If an empty entry exists (S903: YES), the memory controller 310 migrates one stored data of the valid pages selected at step S902 to the relevant entry (S907). Here, the storage controller 120 sets the valid flag 5003 of that entry to "on" (in use). Then, the storage controller 120 sets the dirty register 5005 to "sub" (substitute status) (S908).

Meanwhile, if an empty entry does not exist (S903: NO), the storage controller 120 searches whether an entry (original data retention entry) where the dirty register 5005 is "no" exists (S904). If an original data retention entry exists (S904: YES), since there is no problem in overwriting that entry, the routine proceeds to step S907 as with the case where the empty entry exists.

If an original data retention entry does not exist (S904: NO), the storage controller 120 performs write-back of the stored data of the entry (update data retention entry) where the dirty register 5005 is "yes" to the flash memory 320 (refer to S905 of FIG. 14), and sets the dirty register 5005 to "no" (S906). Thereby, since there is no problem in overwriting that entry, the routine proceeds to step S907 as with the case where the empty entry exists. Incidentally, for instance, an LRU algorithm is used for selecting the entry to be subject to the write-back processing at step S905. The storage controller 120 repeats steps S903 to S908 until the migration of stored data of all valid pages selected at step S902 is complete (S909).

When the migration of all stored data is complete (S909: YES), the memory controller 310 detects the physical page address of the respective valid pages in the defective block from the PPA 5102 of the address translation table 510 (S910). Then, the memory controller 310 sets the page status of the detected physical page address to "8" (invalid) in the page status table 520, and clears the PPA 5102 of the address translation table 510 (sets "no correspondence") (S911). Finally, the memory controller 310 sets the page status of the respective pages configuring the defective block to "9" (defective) (S917), and thereafter ends the defective block substitute processing.

Meanwhile, as the substitute processing to be performed to the flash memory, foremost, the memory controller 310 performs garbage collection processing (S912) to secure an erased block where all pages are in an unwritten state.

Subsequently, the memory controller 310 detects valid pages in the defective block from the page status table 520, and migrates the stored data thereof to the erased block (S913). The memory controller 310 thereafter sets the status of the respective migration destination pages to "0" (valid) in the page status table 520 (S914). Further, the memory controller 310 detects the physical page address of the respective valid pages in the defective block from the PPA 5102 of the address translation table 510 (S915). The memory controller 310 thereafter sets the physical page address of the respective migration destination pages at step S913 in the column of the PPA 5102 (S916). Finally, the memory controller 310 sets the page status of the respective pages configuring the defective block to "9" (defective) (S917), and thereafter ends the defective block substitute processing.

Incidentally, as the valid pages to be selected at step S902, it is desirable to select the valid pages storing data of logical pages that are rewritten frequently. This is because to perpetually retain data of logical pages that are hardly rewritten in the cache memory 123 would be inefficient in terms of performance.

Figure 16:
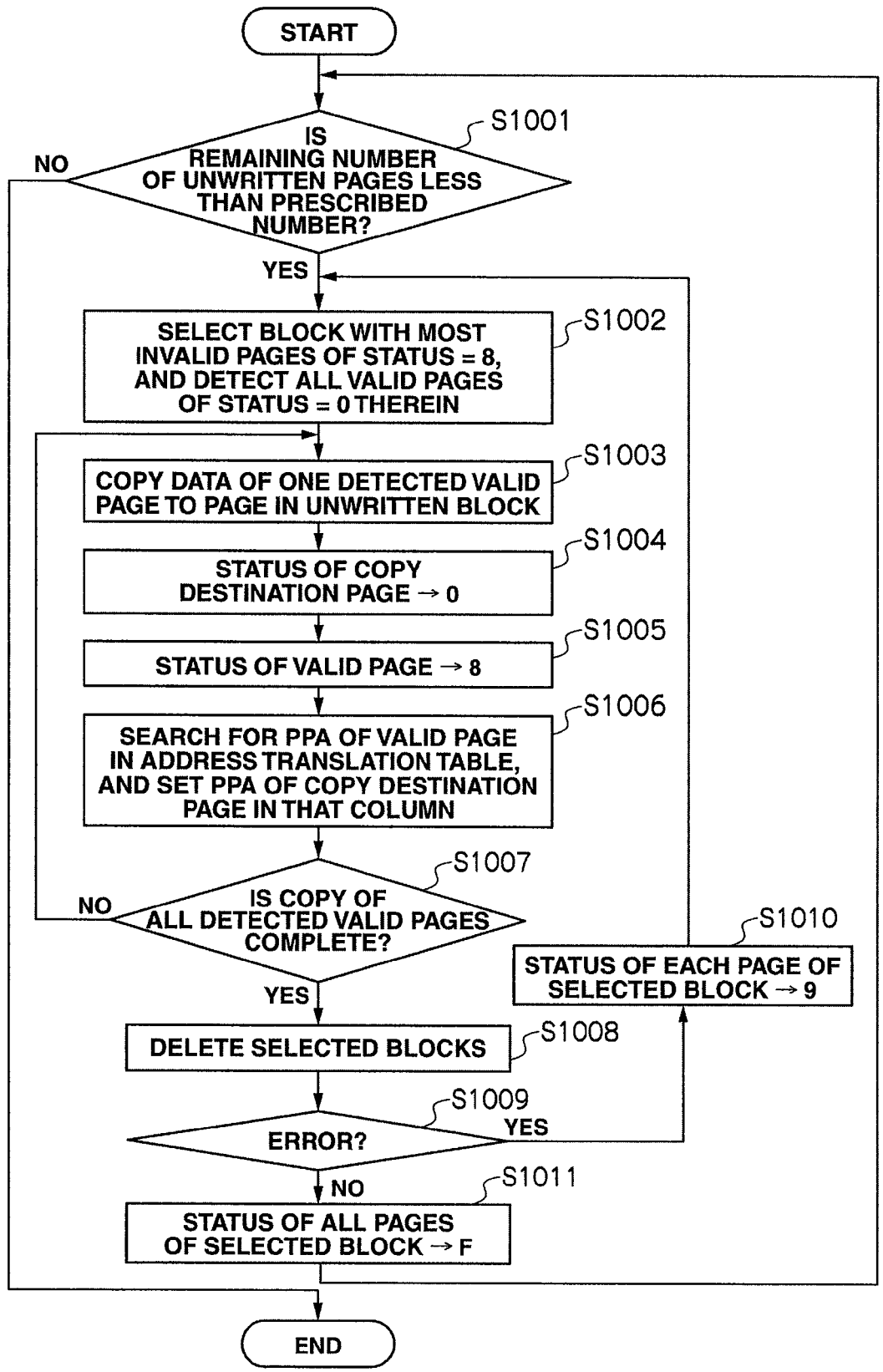
FIG. 16 is a flowchart showing the garbage collection processing to be performed by the memory controller according to the present invention.

FIG. 16 is a flowchart showing the detailed processing routine of the garbage collection processing S808 to be performed by the memory controller 310 in FIG. 14, and the garbage collection processing S912 to be performed by the memory controller 310 in FIG. 15. The processing routine is explained below.

Foremost, the memory controller 310 refers to the page status table 520 and searches whether the remaining number of pages where the page status value="F" (unwritten) fell below a prescribed value (S1001). Incidentally, the prescribed number at step S808 is "one block worth of total page count (4 pages in the example of FIG. 6 to FIG. 11)," and the prescribed number at step S912 is "two blocks worth of total page count (8 pages in the example of FIG. 6 to FIG. 11)." If the result at step S1001 is false (greater than a prescribed value) (S1001: NO), the memory controller 310 does nothing and ends the processing as is.

Meanwhile, if the result is true (less than a prescribed value) (S1001: YES), the memory controller 310 selects one block containing the most pages where the page status value="8" (invalid), and detects all valid pages among the above where the page status value="0" (valid) (S1002). Incidentally, the detected valid page count is referred to as N.

Subsequently, the memory controller 310 selects unwritten pages where the page status value=F existing in blocks other than the selected blocks, and copies (saves) data stored in one of the valid pages detected at step S1002 to one unwritten page (S1003). The memory controller 310 thereafter sets the page status value of the respective copy destination pages at step S1003 to "0" in the page status table 520 (S1004). Then, the memory controller 310 sets the page status value of the valid pages detected at step S1002 to "8" (invalid) (S1005). Further, by searching for the address of the valid pages detected at step S1002 from all physical page addresses (PPA) set in the address translation table 510, the memory controller 310 detects the PPA 5102 to which the foregoing address is set, and copies the physical page address of the copy destination page at step S1003 (S1006).

Subsequently, the memory controller 310 determines whether all detected valid pages have been copied (S1007). Then, if all detected valid pages have not yet been copied (S1007: NO), the routine returns to step S1003. In other words, the memory controller 310 repeats the steps S1003 to S1006 regarding all of the N-number of detected valid pages. Thereby, all pages in the blocks selected at step S1002 will become invalidated, and the saving of the page data to be stored will also be complete.

Meanwhile, if all detected valid pages have been copied (S1007: YES), the memory controller 310 erases the blocks selected at step S1002 (S1008). Then, the memory controller 310 determines whether an error occurred during the erasing process (S1009). If an error occurred during the erasing process (S1009: YES), the memory controller 310 sets the status of the respective pages of the selected block to "9" (defective) in the page status table 520 (S1010), and returns to step S1002. If an error did not occur during the erasing process and the erasure was successful (S1009: NO), the memory controller 310 sets the page status value of all pages in the block to "F" (unwritten) in the page status table 520 (S1011). The memory controller 310 repeats the foregoing process until the result at step S1001 becomes false, and thereafter ends the processing.

(5) Estimated Comparison Method of Changes in Write Performance Based on Defective Block Substitute Destination An example of estimating and comparing changes in the write performance at step S900 of the FIG. 15 is now explained.

At the point in time when a defective block is generated, the number of logical blocks managed in the flash memory chip 321 is defined as M, and the number of physical blocks available (that is; not defective) in the flash memory chip 321 is defined as N. Here, the logical page redundancy of the flash memory chip 321 will be N/M.

Further, the total capacity of the cache memory 123 is defined as C, the block size of the flash memory chip 321 is defined as B, and the number of defective blocks substituted in the cache memory 123 is defined as S. Here, the capacity of the cache memory 123 available as a cache will be "C−B*S" (* represents multiplication).

Further, the time required for the processing (S703 to S705) enclosed in P730 in FIG. 12 is defined as cache memory write processing time Tc, and the time required for the processing (S706 to S710 and S705) enclosed in P740 is defined as flash memory write processing time Tf.

The cache memory write processing time Tc is constant. Nevertheless, the flash memory write processing time Tf is not constant since the time required for the write-back processing to be performed at step S708 changes as a result of depending on the status of the flash memory chip 321. As shown in FIG. 14, the write-back processing at step S708 includes the garbage collection processing at S808. As shown in FIG. 16, valid pages are substituted between two blocks in the garbage collection processing at step S808. As explained with reference to FIG. 6 to FIG. 8, the smaller the logical page redundancy N/M, the greater the average substituted page count. Thus, the smaller the logical page redundancy N/M, the longer the time required to perform the write-back processing at step S708. Accordingly, the flash memory write processing time Tf will be the function Tf(N/M) of the logical page redundancy N/M.

Subsequently, the size of data subject to write access by the host computer 100 during the past fixed time Δt is defined as A, and the hit rate of the cache memory 123 during that period is defined as R. Here, the hit rate R is represented as follows.

When A is greater than C−B*S, R=(C−B*S)/A
When A is less than C−B*S, R=1

In addition, the expected value Tw of the write access processing time of the host computer 100 is represented as follows.

When A is greater than C−B*S, Tw=R*Tc+(1−R)Tf
When A is less than C−B*S, Tw=Tc

According to the above, the write processing time expected value Tw will become the function Tw (S, M, N) of S, M, N. The memory controller 310 evaluates how the function Tw will change the substitute destination of the defective block based on information such as "R," "S," "A" managed by the storage controller 120.

When the cache memory 123 is used for the substitution, since "S" is incremented by 1, "M" is decreased by 1, and "N" is decreased by 1, the write processing time expected value is estimated to change to Tw (S+1, M−1, N−1). When the flash memory 320 is used for the substitution, since "S" remains unchanged, "M" remains unchanged, and "N" is decreased by 1, the write processing time expected value is estimated to change to Tw (S, M, N−1).

When the Tw (S+1, M−1, N−1) is less than the Tw (S, M, N−1), it would be more advantageous to use the flash memory 320 as the substitute destination. Further, when the Tw (S+1, M−1, N−1) is greater than the Tw (S, M, N−1), it would be more advantageous to use the cache memory 123 as the substitute destination. The substitute destination of the defective block is selected based on the result of the foregoing comparison.

For example, under circumstances where the hit rate R of the cache memory 123 is extremely low such as during random writing, it would be advantageous to shorten the expected value Tw of the write access processing time by shortening the flash memory write processing time Tf. Thus, the cache memory 123 can be more easily selected as the substitute destination. Further, for instance, under circumstances where the hit rate R of the cache memory 123 is extremely high such as during partial concentrated writing, it would be advantageous to maintain the hit rate R by maintaining the capacity of the cache memory 123 available as the cache, and inhibit the increase of the expected value Tw of the write access processing time. Thus, the flash memory 320 can be more easily selected as the substitute destination.

Incidentally, in the foregoing evaluation, by setting a lower limit to the ratio of capacity of the cache memory 123 available as the cache in relation to the total capacity C of the cache memory 123, or setting an upper limit to the defective block count S to be substituted with the cache memory 123, it is possible to restrict the cache memory 123 from being selected as the substitute destination, or prevent the performance of the storage system 10 from becoming unstable as a result of the capacity of the cache memory 123 available as the cache becoming too low. The term unstable as used herein means a state where the performance fluctuates significantly in relation to the fluctuation of the access patter from the host computer 100, and the guaranteed performance cannot be secured.

Incidentally, in the foregoing evaluation, since the memory controller 310 acquires information such as "R," "S," "A" managed by the storage controller 120, the storage controller 120 issues a command for sending such information, and the flash memory modules 151 to 154, 161 to 164, 171 to 174 and 181 to 184 understand such command.

(6) Optimization of Write Performance Based on Migration of Substitute Data

In the foregoing embodiment, although the optimal location of the substitute destination during the generation of a defective block was evaluated, the optical distribution of the defective block substitute destination can also be evaluated even during a standard operational state, and the distribution can be adjusted.

The memory controller 310 constantly monitors information such as "R," "S," "A" managed by the storage controller 120, and implements the optimization of the function Tw (S, M, N).

In other words, for example, when one block worth of substitute data in the cache memory 123 is migrated to the flash memory 320, since "S" is decreased by 1, "M" is incremented by 1, and "N" remains unchanged, the write processing time expected value is estimated to change to Tw (S−1, M+1, N). Contrarily, when one block worth of substitute data in the flash memory 320 is migrated to the cache memory 123, since "S" is incremented by 1, "M" is decreased by 1, and "N" remains unchanged, the write processing time expected value is estimated to change to Tw (S+1, M−1, N).

When the write processing time expected value Tw (S−1, M+1, N) is less than the write processing time expected value Tw (S, M, N), one block worth of substitute data in the cache memory 123 is migrated to the flash memory 320. Further, when the write processing time expected value Tw (S+1, M−1, N) is less than the write processing time expected value Tw (S, M, N), one block worth of substitute data in the flash memory 320 is migrated to the cache memory 123.

As described above, with the storage system 10 which uses the flash memory 320 as the main memory medium, is equipped with the cache memory 123, and employs the present invention, since it is possible to inhibit the deterioration of the operating efficiency during the update of stored data pursuant to the increase in the number of defective blocks of the flash memory 320, the storage system 10 of the present invention yields an effect of inhibiting the deterioration of the write performance in comparison to conventional storage system equipped with flash memories and cache memories.

In (4) to (6) above, although a case was illustrated where the cache memory 123 is used as the substitute for the defective block, the configuration may be such as the cache memory 124 is used for the substitute destination. Further, in the evaluation of (5) and (6) above, the total capacity C combining the cache memories 123 and 124 and the average hit rate R of these memories may be used for the calculation.

(7) Improvement of Reliability of Cache Memory Data

In the foregoing embodiment, the cache memories 123, 124 may also be configured from nonvolatile memories. As a result, the data substituted from the flash memory chip 321 to the cache memory 123 can be perpetually retained without requiring any power source.

An example of a nonvolatile memory is a phase-change RAM. It is desirable to use a phase-change RAM having a structure where the capacitor portion of the dynamic random access memory is replaced with a phase-change material known as GST (Ga—Sb—Te) used in optical disks and the like. Since the phase-change RAM has roughly the same write performance as the dynamic random access memory, it is able to enjoy the effects of the present invention even with the embodiment described above.

Another example of a nonvolatile memory is a flash memory. This flash memory may be the same type as the flash memory chip 321. This flash memory, however, includes numerous backup extents in order to increase the data update operating efficiency and has a performance capable of rewriting data at a speed that is faster than the flash memory chip 321. Therefore, it is able to enjoy the effects of the present invention even with the embodiment described above. Incidentally, the address translation table 510 and the page status table 520 as in the RAM 313 is further created in the shared memory 129 in the foregoing case so as to manage the data storage location in the cache memories 123, 124.

Since the storage system 10 equipped with nonvolatile cache memories is able to retain the data substituted from the flash memory to the cache memory without requiring any auxiliary power source, the present invention yields an effect of reducing the electrical power consumption of the storage system, and protecting the volatile loss of data caused by a failure such as a sudden power shutdown.

Further, the flash memory substitute data (dirty=stored data of sub entry) contained in the cache memory 123 in the foregoing embodiment can also be duplicated in the other cache memory 124 to be retained and managed in duplicate. Thereby, since the flash memory substitute data will not be lost even if the cache memory 123 malfunctions, it is possible to preserve the reliability of the storage system 10.

Incidentally, a method other than the foregoing method of duplication (mirroring) described above can be employed as the method of retaining the flash memory substitute data. For example, cache memories can be further added to the storage system 10, a plurality of cache memories can be used to configure a RAID group, and a redundant system such as RAID 5 can be employed to retain the flash memory substitute data.

(8) Other Embodiments

Although the foregoing embodiment explained a case of applying the present invention to a storage system 10 comprising a flash memory 320 for writing data in page units and erasing the data in units of a block configured from a plurality of pages, and having a plurality of blocks and requiring the deletion of the blocks containing the pages in order to update the data, a cache memory 123 for writing and temporarily storing data to be written in the flash memory 320 at a speed that is faster than the flash memory 320, a controller 120 for controlling the reading, writing and deletion of data of the flash memory 320 and the reading and writing of data of the cache memory 123, and detecting the generation of a defective block in the flash memory 320, and a host computer 100 for issuing a command requesting the write processing of the data, wherein the storage controller 120 containing the channel adapter 121, 122 and the storage adapters 125, 126 migrates prescribed data of "E," "F," "G" and "H" stored in the flash memory 320 to the cache memory 123 upon detecting the generation of the defective block in the flash memory 320 and, even upon receiving from the host computer 100 a command for updating the migrated data, disables the writing of data in the flash memory 320 based on the command, the present invention is not limited thereto, and may be broadly applied to other storage systems of various configurations.

Further, although a case was explained where the storage system 10 comprises the cache management table 500 for managing data to be stored in the cache memory 123 in the shared memory 129, and the cache management table 500 retains "sub" (items of dirty register 5005) as the disable information for disabling the writing of data in the flash memory 320, the method of retaining such disable information is not limited to the above.

Further, although a case was explained where the storage system 10 comprises the address translation table 510 for managing the correspondence of the LPA 5101 and the PPA 5102 of the data stored in the flash memory 320 in the RAM 313, and the address translation table 510 retains "–" as the address nonexistent information representing that the PPA 5102 corresponding to "E," "F," "G" and "H" of the LPA 5101 of the data, the method of retaining the address nonexistent information is not limited to the above.

The present invention can be broadly applied to various storage systems.

We claim:

1. A storage system, comprising:
   a flash memory for writing data in page units and erasing said data in units of a block configured from a plurality of said pages, and having a plurality of said blocks and requiring the deletion of said blocks containing said pages in order to update said data;
   a cache memory for writing and temporarily storing data to be written in said flash memory at a speed that is faster than said flash memory;
   a controller for controlling the reading, writing and deletion of data of said flash memory and the reading and writing of data of said cache memory, and detecting the generation of a defective block in said flash memory; and
   a host computer for issuing a command requesting the write processing of said data,
   wherein said controller migrates prescribed data stored in said flash memory to said cache memory upon detecting the generation of said defective block in said flash memory and, even upon receiving from said host computer a command for updating the migrated data, disables the writing of data in said flash memory based on said command.

2. The storage system according to claim 1, wherein data migrated to said cache memory is updated based on a command for updating said migrated data.

3. The storage system according to claim 1, further comprising:
   a cache management table for managing said data to be stored in said cache memory,
   wherein said cache management table retains disable information for disabling the writing of said data in said flash memory.

4. The storage system according to claim 1, further comprising:
   an address translation table for managing the correspondence of a logical page address and a physical page address of data to be stored in said flash memory,
   wherein said address translation table retains address nonexistent information representing that a physical page address corresponding to a logical page address of said data does not exist.

5. The storage system according to claim 1, wherein said controller calculates a hit rate showing the probability of data of a logical page address that is the same as the logical page address of said data existing in said cache memory upon writing said data in said cache memory based on a command from said host computer; and
   upon detecting the generation of said defective block, calculates a first write performance of said storage system when another block in said flash memory is applied as a substitute destination of said defective block and a second write performance of said storage system when a part of said data stored in said flash memory is migrated to said cache memory based on said hit rate calculated up to said detection of said defective block, and migrates said data stored in said flash memory to said cache memory based on said calculation result when said second write performance is determined to be superior to said first write performance.

6. The storage system according to claim 1, wherein said cache memory is a nonvolatile random access memory.

7. The storage system according to claim 6, wherein said nonvolatile random access memory is a phase-change Random Access Memory (RAM).

8. The storage system according to claim 1, wherein said data migrated to said cache memory is retained redundantly by said cache memory.

9. The storage system according to claim 8, further comprising:
a cache memory that is different from said cache memory, and
wherein said redundant retention is performed by copying said data, which was migrated to said cache memory, to said different cache memory.

10. The storage system according to claim 8, further comprising:
a plurality of cache memories that are different from said cache memory, and
wherein said redundant retention is performed by configuring said data migrated to said cache memory as a Redundant Arrays of Inexpensive Disks (RAID) group with said plurality of different cache memories.

11. A method for preventing deterioration of write performance in a storage system comprising:
a flash memory for writing data in page units and erasing said data in units of a block configured from a plurality of said pages, and having a plurality of said blocks and requiring the deletion of said blocks containing said pages in order to update said data;
a cache memory for writing and temporarily storing data to be written in said flash memory at a speed that is faster than said flash memory;
a controller for controlling the reading, writing and deletion of data of said flash memory and the reading and writing of data of said cache memory, and detecting the generation of a defective block in said flash memory; and
a host computer for issuing a command requesting the write processing of said data;
wherein said controller performs the steps of:
detecting the generation of said defective block in said flash memory;
migrating prescribed data stored in said flash memory to said cache memory; and
even upon receiving from said host computer a command for updating the migrated data, disabling the writing of data in said flash memory based on said command.

12. The method for preventing deterioration of write performance in a storage system according to claim 11, wherein said data is disabled from being written in said flash memory based on disable information retained in a cache management table for storing said data to be stored in said cache memory.

13. The method for preventing deterioration of write performance in a storage system according to claim 11, wherein said controller calculates a hit rate showing the probability of data of a logical page address that is the same as the logical page address of said data existing in said cache memory upon writing said data in said cache memory based on a command from said host computer; and
upon detecting the generation of said defective block, calculates a first write performance of said storage system when another block in said flash memory is applied as a substitute destination of said defective block and a second write performance of said storage system when a part of said data stored in said flash memory is migrated to said cache memory based on said hit rate calculated up to said detection of said defective block, and migrates said data stored in said flash memory to said cache memory based on said calculation result when said second write performance is determined to be superior to said first write performance.

14. The method for preventing deterioration of write performance in a storage system according to claim 11, wherein said cache memory is a nonvolatile random access memory.

15. The method for preventing deterioration of write performance in a storage system according to claim 11, wherein said data migrated to said cache memory is retained redundantly by said cache memory.

16. The method for preventing deterioration of write performance in a storage system according to claim 15, wherein said redundant retention is performed by copying said data, which was migrated to said cache memory, to a cache memory that is different from said different cache memory.

17. The method for preventing deterioration of write performance in a storage system according to claim 15, wherein said storage system further comprising:
a plurality of cache memories that are different from said cache memory, and
wherein said redundant retention is performed by configuring said data migrated to said cache memory as a RAID group with a plurality of cache memories that are different from said cache memory.

* * * * *